US012750884B2

(12) United States Patent
Fehrenbach et al.

(10) Patent No.: US 12,750,884 B2
(45) Date of Patent: Sep. 29, 2026

(54) CONFIGURED GRANTS WITHIN A TRANSMITTER COT

(71) Applicant: Fraunhofer-Gesellschaft zur Foerderung der angewandten Forschung e.V., Munich (DE)

(72) Inventors: Thomas Fehrenbach, Berlin (DE); Baris Goektepe, Berlin (DE); Cornelius Hellge, Berlin (DE); Thomas Wirth, Berlin (DE); Thomas Schierl, Berlin (DE); Khaled Shawky Hassan Hussein, Erlangen (DE); Martin Leyh, Erlangen (DE); Thomas Heyn, Erlangen (DE); Bernhard Niemann, Erlangen (DE); Julian Popp, Erlangen (DE); Nithin Srinivasan, Berlin (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 532 days.

(21) Appl. No.: 17/581,672

(22) Filed: Jan. 21, 2022

(65) Prior Publication Data

US 2022/0150968 A1 May 12, 2022

Related U.S. Application Data

(63) Continuation of application No. PCT/EP2020/070483, filed on Jul. 20, 2020.

(30) Foreign Application Priority Data

Jul. 25, 2019 (EP) .................................... 19188276

(51) Int. Cl.
*H04W 74/08* (2024.01)
*H04W 72/23* (2023.01)
*H04W 74/0816* (2024.01)

(52) U.S. Cl.
CPC ....... *H04W 74/0816* (2013.01); *H04W 72/23* (2023.01)

(58) Field of Classification Search
CPC ............. H04W 74/0816; H04W 72/23; H04W 74/0808; H04L 5/0098; H04L 5/001
See application file for complete search history.

(56) References Cited

U.S. PATENT DOCUMENTS

2017/0325258 A1 11/2017 Nogami et al.
2020/0305191 A1* 9/2020 Moon .................. H04W 72/23
(Continued)

FOREIGN PATENT DOCUMENTS

IN 201744007515 A 9/2017
IN 201837007096 A 8/2018
(Continued)

OTHER PUBLICATIONS

Charter Communications, "Configured Grant Enhancements", 3GPP TSG RAN WG1 Meeting #97, Reno, NV, May 13-17, 2019, Doc. No. R1-1907119, XP051728565, May 13, 2019, 3 pp.
(Continued)

*Primary Examiner* — John D Blanton
(74) *Attorney, Agent, or Firm* — Ashurst Perkins Coie US LLP; Michael A. Glenn

(57) ABSTRACT

A user device, UE, for a wireless communication system is served by a base station and uses one or more frequency bands for a communication with one or more entities, e.g., other UE(s) or other gNB(s), in the wireless communication system. Some or all of the plurality of frequency bands are unlicensed frequency bands on which a communication is
(Continued)

allowed for a certain transmission time (COT) responsive to a successful channel access procedure e.g. Listen-Before-Talk, LBT. The UE is configured, e.g., using an RRC signaling, with one or more configured grant, CG, configurations so as to allow the UE to perform one or more CG transmissions. Responsive to detecting a COT and a potential collision of a CG transmission with the COT, e.g. the COT of another entity, e.g., other UE(s) or other gNB(s), in the wireless communication system, the UE deactivates or backs off the CG transmission.

10 Claims, 13 Drawing Sheets

(56) References Cited

U.S. PATENT DOCUMENTS

| | | | | |
|---|---|---|---|---|
| 2020/0322982 | A1* | 10/2020 | Wu | H04W 16/14 |
| 2020/0351941 | A1* | 11/2020 | Aldana | H04W 74/006 |
| 2020/0359409 | A1* | 11/2020 | Karaki | H04W 72/0446 |
| 2020/0359411 | A1* | 11/2020 | Li | H04W 16/14 |
| 2020/0374933 | A1 | 11/2020 | Lou et al. | |
| 2021/0029768 | A1* | 1/2021 | Shih | H04W 72/0453 |
| 2021/0153195 | A1* | 5/2021 | Zhu | H04W 72/0446 |
| 2021/0204322 | A1* | 7/2021 | Lou | H04W 74/004 |
| 2021/0314999 | A1* | 10/2021 | Chen | H04W 76/11 |
| 2021/0321456 | A1* | 10/2021 | Yang | H04W 74/0816 |
| 2021/0336727 | A1* | 10/2021 | Miao | H04L 1/1819 |
| 2021/0344451 | A1* | 11/2021 | Hedayat | H04W 74/002 |
| 2021/0344453 | A1* | 11/2021 | Lei | H04W 72/23 |
| 2021/0352633 | A1* | 11/2021 | Tiirola | H04L 5/0053 |
| 2022/0046559 | A1* | 2/2022 | Wu | H04W 52/50 |
| 2022/0061090 | A1* | 2/2022 | Fehrenbach | H04W 74/0808 |
| 2022/0070922 | A1* | 3/2022 | Talarico | H04W 72/1268 |
| 2022/0095301 | A1* | 3/2022 | Oviedo | H04L 5/001 |
| 2022/0150917 | A1* | 5/2022 | Wang | H04W 16/14 |
| 2022/0150968 | A1* | 5/2022 | Fehrenbach | H04L 5/0098 |
| 2022/0167407 | A1* | 5/2022 | Oviedo | H04W 72/0446 |
| 2022/0167423 | A1* | 5/2022 | Aldana | H04W 74/004 |
| 2022/0174699 | A1* | 6/2022 | El Hamss | H04W 72/1268 |
| 2022/0174735 | A1* | 6/2022 | Li | H04W 74/0816 |
| 2022/0183053 | A1* | 6/2022 | Li | H04W 74/006 |
| 2022/0210827 | A1* | 6/2022 | Wang | H04W 16/14 |
| 2022/0263630 | A1* | 8/2022 | Fehrenbach | H04L 5/0053 |
| 2022/0322409 | A1* | 10/2022 | Yokomakura | H04L 5/0048 |
| 2022/0330338 | A1* | 10/2022 | Karaki | H04W 74/0866 |
| 2022/0346147 | A1* | 10/2022 | Wang | H04W 74/002 |
| 2022/0353877 | A1* | 11/2022 | Wang | H04W 72/23 |
| 2023/0345433 | A1* | 10/2023 | Bhattad | H04L 1/08 |

FOREIGN PATENT DOCUMENTS

| | | | | | |
|---|---|---|---|---|---|
| JP | 2021519000 | A | | 8/2021 | |
| KR | 20220041876 | A | * | 4/2022 | H04W 72/23 |
| WO | 2019139876 | A1 | | 7/2019 | |
| WO | WO-2020165183 | A1 | * | 8/2020 | H04W 72/23 |
| WO | WO-2021013811 | A1 | * | 1/2021 | H04W 72/23 |

OTHER PUBLICATIONS

Cisco, “Enterprise Mobility 3.0 Design Guide”, https://www.cisco.com/c/en/us/td/docs/solutions/Enterprise/Mobility/emob41dg/emob41dg-wrapper/ch5_QoS.html#wp1021972.

ETSI, “Broadband Radio Access Networks (BRAN); 5 GHz high performance RLAN; Harmonized EN covering the essential requirements of article 3.2 of the R&TTE Directive”, ETSI EN 301 893 V1.7.1 (Jun. 2012) (90 pages), Jun. 2012, 47 pp. Uploaded in 2 parts.

ETSI, “5 GHz RLAN; Harmonised Standard covering the essential requirements of article 3.2 of Directive 2014/53/EU”, EN 301.893 (V2.0.7) 7 (Nov. 2016), Nov. 2016, 123 pp.

Ilmenau University of Technology, “IEEE 802.11”, https://www.tu-ilmenau.de/fileadmin/public/iks/files/lehre/mobicom/AN-10-IEEE_802_11.pdf).

Intel Corporation, “Enhancements to configured grants for NR-unlicensed”, 3GPP TSG RAN WG1 Meeting #96b, Xi’an, China, Apr. 8-12, 2019, Doc. No. R1-1904288, XP051699604, Apr. 7, 2019, 8 pp.

TCL Communications, “Discussion on COT sharing for configured grants”, 3GPP TSG RAN WG1 Meeting #94bis, Chengdu, China, Oct. 8-12, 2018; doc. No. R1-1811082. XP051518483, Sep. 28, 2018, 4 pp.

Huawei, et al., “Transmission with configured grant in NR unlicensed band”, 3GPP TSG RAN WG1 #97, 3GPP Server disclosure date (May 3, 2019), Doc. No. R1-1906047, May 3, 2019, 22 pp.

Qualcomm Incorporated, “DL signals and channels for NR-U”, 3GPP TSG RAN WG1 #97, 3GPP Server disclosure date (May 4, 2019), Doc. No. R1-1907259, May 4, 2019, 12 pp.

Spreadtrum Communications, “Discussion on configured grant transmission in NR-U operation”, 3GPP TSG RAN WG1 #AH, 3GPP Server disclosure date (Jan. 12, 2019), Doc. No. R1-1900717, Jan. 12, 2019, 3 pp.

Qualcomm, “Channel access procedures for NR unlicensed”, Qualcomm Inc., 3GPP TSG RAN WG1 Meeting #97 R1-1907261, May 4, 2019, 20 pp.

Qualcomm, “Enhancement to configured grants in NR unlicensed”, Qualcomm Inc., 3GPP TSG RAN WG1 Meeting #97 R1-1907264, May 5, 2019, 13 pp.

* cited by examiner

CONFIGURED GRANTS WITHIN A TRANSMITTER COT

CROSS-REFERENCES TO RELATED APPLICATIONS

This application is a continuation of copending International Application No. PCT/EP2020/070483, filed Jul. 20, 2020, which is incorporated herein by reference in its entirety, and additionally claims priority from European Application No. EP 19188276.0, filed Jul. 25, 2019, which is incorporated herein by reference in its entirety.

The present application relates to the field of wireless communication systems or networks, more specifically to enhancements in the communication among network entities of the communication network when performing a communication over one or more subbands, some or all of which include unlicensed bands. Embodiments of the present invention concern enhancements in an NR-U operation employing configured grants, CGs.

BACKGROUND OF THE INVENTION

FIG. 1 is a schematic representation of an example of a terrestrial wireless network 100 including, as is shown in FIG. 1(*a*), a core network 102 and one or more radio access networks $RAN_1$, $RAN_2$, . . . $RAN_N$. FIG. 1(*b*) is a schematic representation of an example of a radio access network $RAN_n$ that may include one or more base stations $gNB_1$ to $gNB_5$, each serving a specific area surrounding the base station schematically represented by respective cells $\mathbf{106}_1$ to $\mathbf{106}_5$. The base stations are provided to serve users within a cell. The one or more base stations may serve users in licensed and/or unlicensed bands. The term base station, BS, refers to a gNB in 5G networks, an eNB in UMTS/LTE/LTE-A/LTE-A Pro, or just a BS in other mobile communication standards. A user may be a stationary device or a mobile device. The wireless communication system may also be accessed by mobile or stationary IoT devices which connect to a base station or to a user. The mobile devices or the IoT devices may include physical devices, ground based vehicles, such as robots or cars, aerial vehicles, such as manned or unmanned aerial vehicles (UAVs), the latter also referred to as drones, buildings and other items or devices having embedded therein electronics, software, sensors, actuators, or the like as well as network connectivity that enables these devices to collect and exchange data across an existing network infrastructure. FIG. 1(*b*) shows an exemplary view of five cells, however, the $RAN_n$ may include more or less such cells, and $RAN_n$ may also include only one base station. FIG. 1(*b*) shows two users $UE_1$ and $UE_2$, also referred to as user equipment, UE, that are in cell $\mathbf{106}_2$ and that are served by base station $gNB_2$. Another user $UE_3$ is shown in cell $\mathbf{106}_4$ which is served by base station $gNB_4$. The arrows $\mathbf{108}_1$, $\mathbf{108}_2$ and $\mathbf{108}_3$ schematically represent uplink/downlink connections for transmitting data from a user $UE_1$, $UE_2$ and $UE_3$ to the base stations $gNB_2$, $gNB_4$ or for transmitting data from the base stations $gNB_2$, $gNB_4$ to the users $UE_1$, $UE_2$, $UE_3$. This may be realized on licensed bands or on unlicensed bands. Further, FIG. 1(*b*) shows two IoT devices $\mathbf{110}_1$ and $\mathbf{110}_2$ in cell $\mathbf{106}_4$, which may be stationary or mobile devices. The IoT device $\mathbf{110}_1$ accesses the wireless communication system via the base station $gNB_4$ to receive and transmit data as schematically represented by arrow $\mathbf{112}_1$. The IoT device $\mathbf{110}_2$ accesses the wireless communication system via the user $UE_3$ as is schematically represented by arrow $\mathbf{112}_2$. The respective base station $gNB_1$ to $gNB_5$ may be connected to the core network 102, e.g. via the S1 interface, via respective backhaul links $\mathbf{114}_1$ to $\mathbf{114}_5$, which are schematically represented in FIG. 1(*b*) by the arrows pointing to "core". The core network 102 may be connected to one or more external networks. Further, some or all of the respective base station $gNB_1$ to $gNB_5$ may connected, e.g. via the S1 or X2 interface or the XN interface in NR, with each other via respective backhaul links $\mathbf{116}_1$ to $\mathbf{116}_5$, which are schematically represented in FIG. 1(*b*) by the arrows pointing to "gNBs".

For data transmission a physical resource grid may be used. The physical resource grid may comprise a set of resource elements to which various physical channels and physical signals are mapped. For example, the physical channels may include the physical downlink, uplink and sidelink shared channels (PDSCH, PUSCH, PSSCH) carrying user specific data, also referred to as downlink, uplink and sidelink payload data, the physical broadcast channel (PBCH) carrying for example a master information block (MIB) and a system information block (SIB), the physical downlink, uplink and sidelink control channels (PDCCH, PUCCH, PSSCH) carrying for example the downlink control information (DCI), the uplink control information (UCI) and the sidelink control information (SCI). For the uplink, the physical channels may further include the physical random access channel (PRACH or RACH) used by UEs for accessing the network once a UE synchronized and obtained the MIB and SIB. The physical signals may comprise reference signals or symbols (RS), synchronization signals and the like. The resource grid may comprise a frame or radio frame having a certain duration in the time domain and having a given bandwidth in the frequency domain. The frame may have a certain number of subframes of a predefined length, e.g. 1 ms. Each subframe may include one or more slots of 12 or 14 OFDM symbols depending on the cyclic prefix (CP) length. A frame may also consist of a smaller number of OFDM symbols, e.g. when utilizing shortened transmission time intervals (sTTI) or a mini-slot/non-slot-based frame structure comprising just a few OFDM symbols.

The wireless communication system may be any single-tone or multicarrier system using frequency-division multiplexing, like the orthogonal frequency-division multiplexing (OFDM) system, the orthogonal frequency-division multiple access (OFDMA) system, or any other IFFT-based signal with or without CP, e.g. DFT-s-OFDM. Other waveforms, like non-orthogonal waveforms for multiple access, e.g. filter-bank multicarrier (FBMC), generalized frequency division multiplexing (GFDM) or universal filtered multi carrier (UFMC), may be used. The wireless communication system may operate, e.g., in accordance with the LTE-Advanced pro standard, or the 5G or NR, New Radio, standard, or the NU-U, New Radio Unlicensed, standard.

The wireless network or communication system depicted in FIG. 1 may by a heterogeneous network having distinct overlaid networks, e.g., a network of macro cells with each macro cell including a macro base station, like base station $gNB_1$ to $gNB_5$, and a network of small cell base stations (not shown in FIG. 1), like femto or pico base stations.

In addition to the above described terrestrial wireless network also non-terrestrial wireless communication networks exist including spaceborne transceivers, like satellites, and/or airborne transceivers, like unmanned aircraft systems. The non-terrestrial wireless communication network or system may operate in a similar way as the terrestrial system described above with reference to FIG. 1, for example in accordance with the LTE-Advanced Pro standard or the 5G or NR, new radio, standard.

It is noted that the information in the above section is only for enhancing the understanding of the background of the invention and therefore it may contain information that does not form conventional technology that is already known to a person of ordinary skill in the art.

Starting from conventional technology as described above, there may be a need for improvements in the wireless communication among entities of a wireless communication network, in case the communication employs configured grants, CGs, like an NR-U operation using one or more subbands, in which some or all of the used subbands are in the unlicensed spectrum.

SUMMARY

An embodiment may have a user device, UE, for a wireless communication system, wherein the UE is served by a base station and is to use one or more frequency bands for a communication with one or more entities, e.g., other UE(s) or other gNB(s), in the wireless communication system, wherein some or all of the plurality of frequency bands are unlicensed frequency bands on which a communication is allowed for a certain transmission time (COT) responsive to a successful channel access procedure, e.g., Listen-Before-Talk, LBT, wherein the UE is configured, e.g., using an RRC signaling, with one or more out-COT configured grant, CG, configurations so as to allow the UE to perform one or more CG transmissions outside a gNB COT by initiating its own COT, and one or more in-COT configured grant, CG, configurations so as to allow the UE to perform one or more CG transmissions within a gNB COT.

Another embodiment may have a base station, BS, for a wireless communication system, wherein the BS is to serve one or more UEs and is to use one or more frequency bands for a communication with the one or more UEs in the wireless communication system, wherein some or all of the plurality of frequency bands are unlicensed frequency bands on which a communication is allowed for a certain transmission time (COT) responsive to a successful channel access procedure, e.g., Listen-Before-Talk, LBT, wherein the BS is to configure, e.g., using an RRC signaling, the one or more UEs with one or more out-COT configured grant, CG, configurations so as to allow the UE to perform one or more CG transmissions outside a COT, e.g. the COT of another entity, e.g., other UE(s) or other gNB(s), in the wireless communication system, and one or more in-COT configured grant, CG, configurations so as to allow the UE to perform one or more CG transmissions within a COT, e.g. the COT of another entity, e.g., other UE(s) or other gNB(s), in the wireless communication system.

Yet another embodiment may have one or more UEs and one or more BSs, wherein the one or more UEs include a user device, UE, for a wireless communication system, wherein the UE is served by a base station and is to use one or more frequency bands for a communication with one or more entities, e.g., other UE(s) or other gNB(s), in the wireless communication system, wherein some or all of the plurality of frequency bands are unlicensed frequency bands on which a communication is allowed for a certain transmission time (COT) responsive to a successful channel access procedure, e.g., Listen-Before-Talk, LBT, wherein the UE is configured, e.g., using an RRC signaling, with one or more out-COT configured grant, CG, configurations so as to allow the UE to perform one or more CG transmissions outside a gNB COT by initiating its own COT, and one or more in-COT configured grant, CG, configurations so as to allow the UE to perform one or more CG transmissions within a gNB COT, and/or the one or more BSs include an inventive BS.

According to another embodiment, a method for operating a wireless communication system may have the steps of:

serving a UE by a base station so as to one or more frequency bands for a communication with one or more entities, e.g., other UE(s) or other gNB(s), in the wireless communication system, wherein some or all of the plurality of frequency bands are unlicensed frequency bands on which a communication is allowed for a certain transmission time (COT) responsive to a successful channel access procedure, e.g., Listen-Before-Talk, LBT, and configuring the UE, e.g., using an RRC signaling, with one or more out-COT configured grant, CG, configurations so as to allow the UE to perform one or more CG transmissions outside a gNB COT by initiating its own COT, and one or more in-COT configured grant, CG, configurations so as to allow the UE to perform one or more CG transmissions within a gNB COT.

According to yet another embodiment, a non-transitory digital storage medium may have a computer program stored thereon to perform the inventive method, when said computer program is run by a computer.

BRIEF DESCRIPTION OF THE DRAWINGS

Embodiments of the present invention will be detailed subsequently referring to the appended drawings, in which:

FIG. 4*a-b* FIG. 4 schematically illustrates a wideband operation for NR-U, wherein FIG. 4(*a*) illustrates a downlink wideband transmission, for example, by a gNB, and FIG. 4(*b*) shows an embodiment for transmitting in the uplink, for example by a UE;

DETAILED DESCRIPTION OF THE INVENTION

Figure 1A:
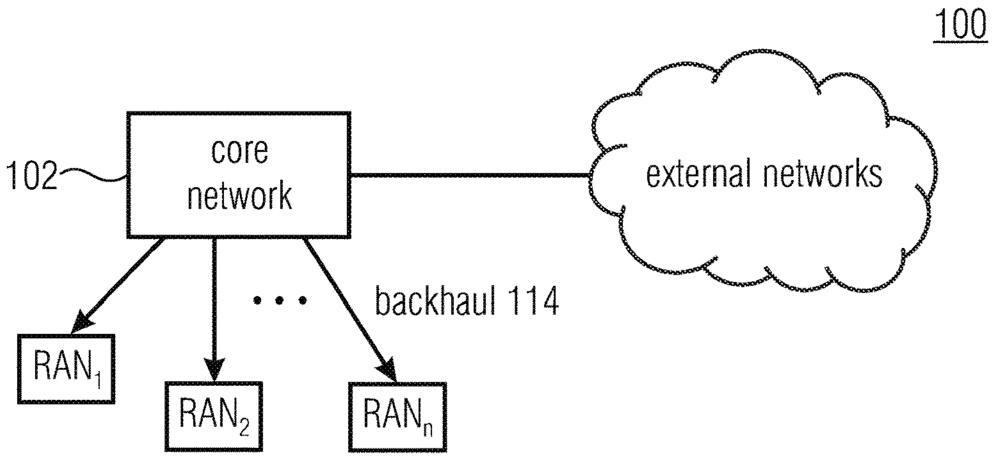
FIG. 1*a-b* shows a schematic representation of an example of a wireless communication system.

Embodiments of the present invention are now described in more detail with reference to the accompanying drawings in which the same or similar elements have the same reference signs assigned.

In mobile communication systems or networks, like those described above with reference to FIG. 1, for example in a LTE or 5G/NR network, the respective entities may communicate using one of more frequency bands. A frequency band includes a start frequency, an end frequency and all intermediate frequencies between the start and end frequencies. In other words, the start, end and intermediate frequencies may define a certain bandwidth, e.g., 20 MHz. A frequency band may also be referred to as a carrier, a bandwidth part, BWP, a subband, and the like.

When using a single frequency band, the communication may be referred to as a single-band operation, e.g., a UE transmits/receives radio signals to/from another network entity on frequencies being within the 20 MHz band.

When using a two or more frequency bands, the communication may be referred to as a multi-band operation or as a wideband operation or as a carrier aggregation operation. The frequency bands may have different bandwidths or the same bandwidth, like 20 MHz. For example, in case of frequency bands having the same bandwidths a UE may transmit/receive radio signals to/from another network entity on frequencies being within two or more of the 20 MHz bands so that the frequency range for the radio communication may be a multiple of 20 MHz. The two or more frequency bands may be continuous/adjacent frequency bands or some or all for the frequency bands may be separated in the frequency domain.

The multi-band operation may include frequency bands in the licensed spectrum, or frequency bands in the unlicensed spectrum, or frequency bands both in the licensed spectrum and in the unlicensed spectrum.

Carrier aggregation, CA, is an example using two or more frequency bands in the licensed spectrum and/or in the unlicensed spectrum.

5G New Radio (NR) may support an operation in the unlicensed spectrum so that a multi-band operation may include frequency bands in the unlicensed spectrum bands. This may be referred to as NR-based access to unlicensed spectrum, NR-U, and the frequency bands may be referred to as subbands. The unlicensed spectrum may include bands with a potential IEEE 802.11 coexistence, such as the 5 GHz and the 6 GHz bands. NR-U may support bandwidths that are an integer multiple of 20 MHz, for example due to regulatory requirements. The splitting into the subbands is performed so as to minimize interference with coexisting systems, like IEE 802.11 systems, which may operate in one or more of the same bands with the same nominal bandwidth channels, like 20 MHz channels. Other examples of coexisting systems may use subbands having subband sizes and nominal frequencies different from the above-described IEEE 802.11 systems. For example, the unlicensed spectrum may include the 5 GHz band, the 6 GHz band, the 24 GHz band or the 60 GHz band. Examples of such unlicensed bands include the industrial, scientific and medical, ISM, radio bands reserved internationally for the use of radio frequency energy for industrial, scientific and medical purposes other than telecommunications.

During an operation using unlicensed subbands a channel access procedure is to be performed separately per subband, e.g., Listen-before-talk, LBT, or a request to send/clear to send mechanism, RTS/CTS mechanism. This may lead to a situation in which one or more of the subbands are busy or occupied due to an interference, for example, from other communication systems coexisting on the same band, like other public land mobile networks, PLMNs or systems operating in accordance with the IEEE 802.11 specification. In such a situation, the transmitter, either the transmitting gNB or the transmitting UE, is only allowed to transmit on the subbands which are detected to be not busy, also referred to as subbands being free or non-occupied, as is determined by the LBT algorithm. For example for a transmission spanning more than 20 MHz in the 5 GHz operational unlicensed band, the transmitter, like the gNB or the UE, performs Listen-Before-Talk, LBT, separately on each subband. Once the LBT results are available for each subband, the devices, for example, the gNB in the downlink, DL, or the UE in the uplink, UL, are allowed to transmit on those subbands which are determined to be free or unoccupied, i.e., to transmit on the won subband(s). No transmission is allowed on the occupied, busy or non-won subbands. In such a case, the receiver, e.g., a UE, may waste energy by blind decoding not only over all the free or non-occupied subbands, which may also be referred to as won subbands, but also over the busy or occupied subbands.

Also the spectral efficiency may decrease, since the channel occupancy during the LBT of the transmitter, like the gNB, may only be of short duration. For example, there may be a short WiFi transmission at the time the gNB performs the LBT which only occupies a part of the transmission time allocated for this transmission, like only a portion of a frame, so that the major part of the frame is unused thereby reducing the spectral efficiency.

Figure 2:
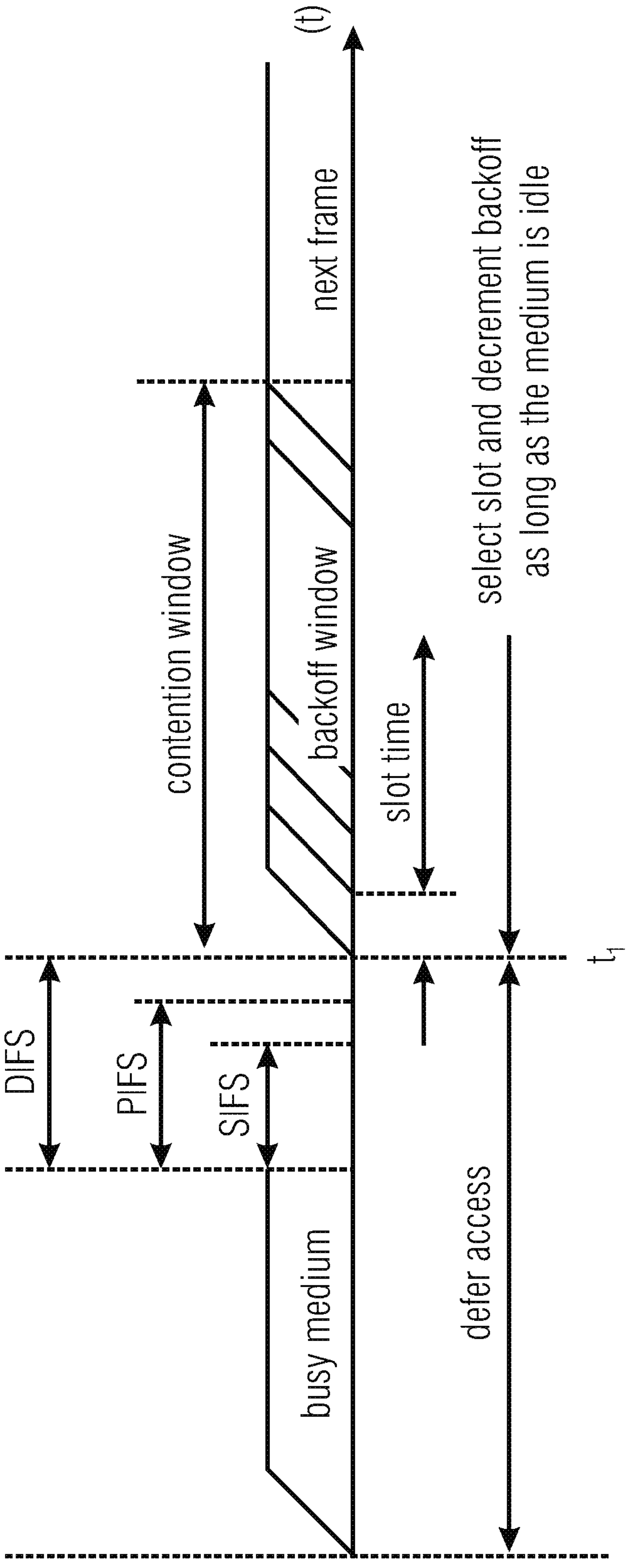
FIG. 2 FIG. 2 illustrates the distributed coordination function, as used in accordance with the IEEE 802.11 specification.

As an example, a situation is now considered in which a subset of the subbands is busy or occupied due to interference by systems operating according to the IEEE 802.11 specification. FIG. 2 illustrates the distributed coordination function, as used in accordance with the IEEE 802.11 specification, more specifically, the interframe spaces, the backoff window and the contention window used by the CSMA/CL algorithm of IEEE 802.11 systems, which is described in more detail in:

[1] https://www.cisco.com/c/en/us/td/docs/solutions/Enterprise/Mobility/emob41dg/emob41dg-wrapper/ch5_QoS.html#wp1021972,

[2] https://www.tu-ilmenau.de/fileadmin/public/iks/files/lehre/mobicom/AN-10-IEEE_802_11.pdf As is shown in FIG. 2, data frames in accordance with the IEEE 802.11 specification are sent using the DCF, which is composed of the following two main components:

interframe spaces, SIFS, PIFS and DIFS depicted in FIG. 2, and random backoff (contention window) DCF to manage access to RF medium.

The three interframe spaces comprise the short interframe space, SIFS, having a duration of typically 10 μs, the point coordination function, PCF, interframe space, PIFS, which is composed of the SCIFS plus 1× slot time which amounts typically to 30 μs, and the DCF interframe space, DIFS, which is composed of the SCIFS plus 2× the slot time of 10 μs so that it amounts typically to 50 μs. The interframe spaces SCIFS, PIFS and DIFS are provided to control which traffic gets first access to the channel after carrier sensing declares the channel to be free, wherein management frames and those frames not expecting contention, like a frame that is part of a sequence of frames, uses SIFS, while data frames use DIFS. In FIG. 2 a situation is illustrated in which, initially, a channel is found to be busy or occupied so that access is deferred until $t_1$ with the appropriate interframe spaces applied. For example, when a data frame using DCF is ready to be sent, a random backoff number between zero and a minimum contention window is generated, and once the channel is free for the DIFS interval the random backoff number begins to be decremented for every slot time, like 20 μs, that the channel remains free. In case the channel becomes busy during that time, for example, because another station's random backoff number is getting to zero before the one of the current station, the decrement stops and the steps are repeated. On the other hand, in case the channel, during the decrementing of the random backoff number remains free until the number reaches zero, the frame is sent, as is indicated at the right hand side in FIG. 2.

Figure 3:
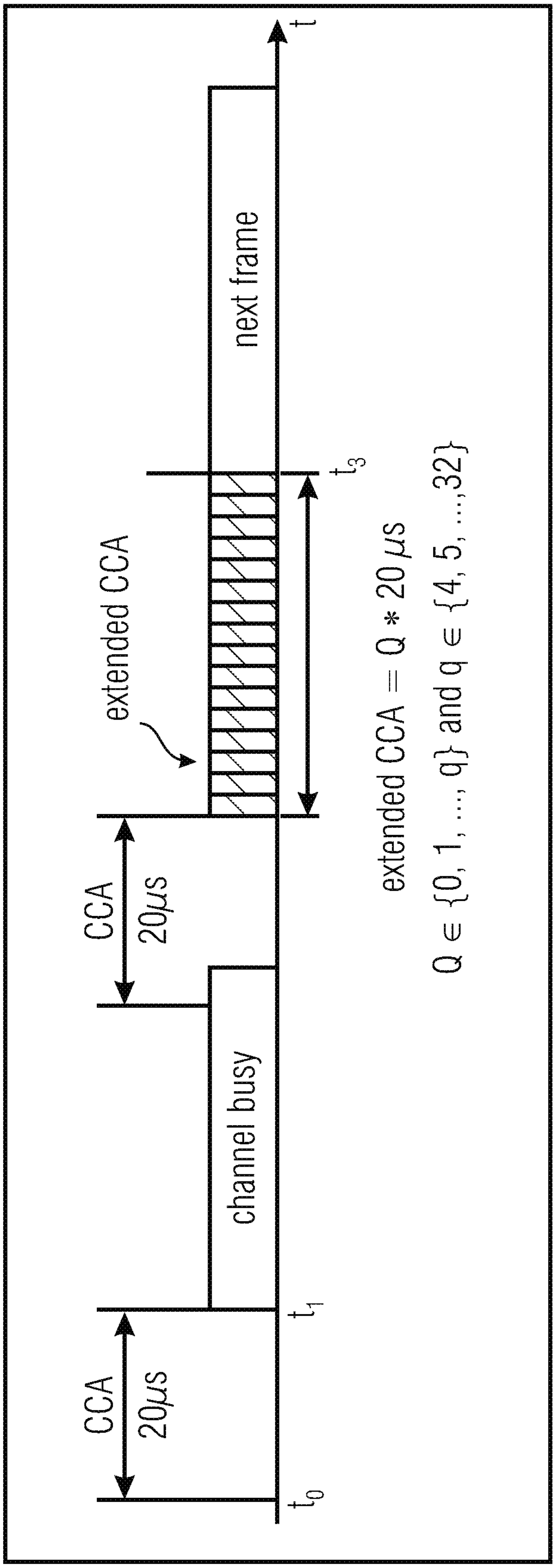
FIG. 3 illustrates an LBT based spectrum sharing mechanism based on the CCA mode.

Reference [3] (https://www.etsi.org/deliver/etsi_en/301800_301899/301893/01.07.01_60/en_301893v010701p.pdf) describes a high performance wireless access system including radio local area network equipment which is used in wireless local area networks. Such networks provide high speed data communications in between devices connected to the wireless infrastructure, and ad-hoc networking is described to allow the devices to communicate directly with each other. In such systems load based equipment may implement an LBT based spectrum sharing mechanism based on the clear channel assessment, CAA, mode using energy detect as described in IEEE 802.11. FIG. 3 illustrates an LBT based spectrum sharing mechanism based on the CCA mode. Before a transmission or a burst of transmissions on a channel, the equipment performs a CCA check using energy detect, and the equipment observes the channel for the CCA observation time which may be not less than 20 μs. This is illustrated in the left hand part of FIG. 3 where at a time $t_0$ the CCA observation time starts. The end of the CCA observation time is $t_1$. In the depicted example, the channel is considered to be occupied or busy because the energy level detected in the channel exceeds a threshold and, accordingly, the equipment does not transmit. Since the equipment found an occupied channel, i.e., since there is not any transmission at this time, the equipment performs an extended CCA during which the channel is observed for a duration of a random factor N multiplied by the CCA observation time. N defines the number of clear idle slots resulting in total idle period that needs to be observed before initiating the transmission. The value N is stored in a counter which is decremented every time a CCA slot is considered to be free or non-occupied and once the counter reaches zero, the equipment may transmit, as indicated at $t_2$ in FIG. 3.

For example, the 5G New Radio (NR) technology supports operation in unlicensed bands through a technology referred to as NR-based access to unlicensed spectrum (NR-U). The unlicensed spectrum may include bands, e.g., with potential IEEE 802.11 coexistence, such as the 5 GHz and the 6 GHz bands. NR-U may support bandwidths that are an integer multiple of 20 MHz, for example due to regulatory requirements. Each of the 20 MHz bandwidth channels is designed as a subband, and the splitting into the subbands is performed so as to minimize interference with coexisting systems, like IEE 802.11 systems, which may operate in one or more of the same bands with the same nominal bandwidth channels, like 20 MHz channels. Other examples, of coexisting systems may use subbands having subband sizes and nominal frequencies different from the above-described IEEE 802.11 systems. For example, unlicensed subbands may be used, for example, the 24 GHz band or the 60 GHz band. Examples of such unlicensed subbands include the industrial, scientific and medical, ISM, radio bands reserved internationally for the use of radio frequency energy for industrial, scientific and medical purposes other than telecommunications.

In general, during a wideband operation using unlicensed subbands, for example a transmission spanning more than 20 MHz in the 5 GHz operational unlicensed band, the transmitter, like the gNB or the UE perform LBT separately on each subband, and once the LBT results are available for each subband, the devices, for example, the gNB in the downlink, DL, or the UE in the uplink, UL, are allowed to only transmit on those subbands which are determined to be free or unoccupied, i.e., to transmit on the won subband. For example, in the 5 GHz unlicensed band, the number of 20 MHz subbands used for a wideband operation may be four, so that the overall bandwidth is 80 MHz, however, the number of actually used subbands may differ.

Figure 4A:
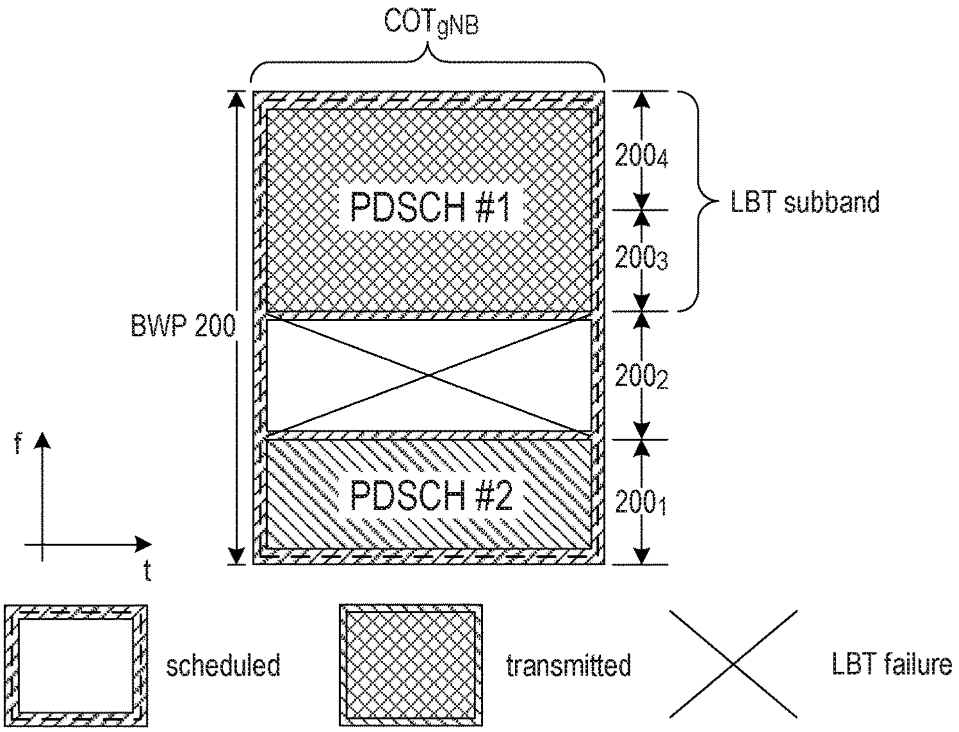
Figure 4B:
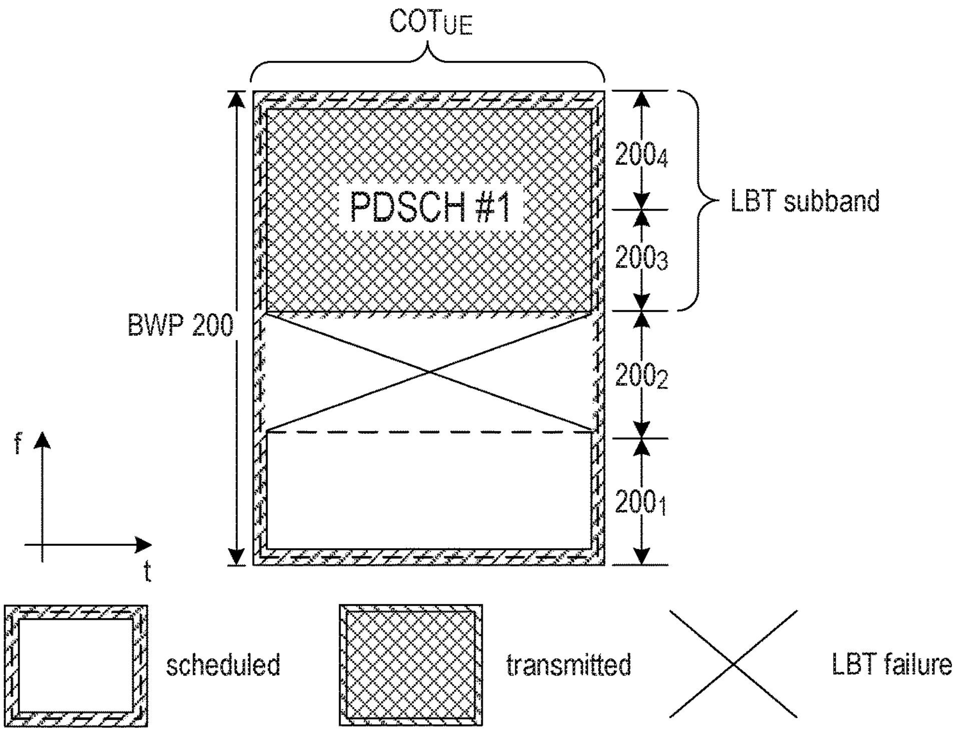

FIG. 4 schematically illustrates a wideband operation for NR-U as described above. For such a wideband operation a certain wideband configuration may be employed which specifies the overall bandwidth for the wideband operation, the number of subbands, the respective bandwidths of the subbands, the duration, like the number of symbols, of the wideband operation over time, also referred to as the channel occupancy time, COT. In the system one or more such wideband configurations may exist. In cases there are multiple wideband configurations the transmitter may select the wideband configuration to be used from the plurality of available wideband configurations.

FIG. 4(*a*) illustrates a downlink wideband transmission, for example, by a gNB. In accordance with the wideband configuration to be used, a bandwidth part, BWP, 200 may be scheduled, i.e., within the available resources the BWP 200 defines a number of subcarriers to be used for the wideband operation. For example, the BWP 200 may have an overall bandwidth of 80 MHz, and the respective subbands, also referred to as LBT subbands $\mathbf{200}_1$ to $\mathbf{200}_4$ have a bandwidth of 20 MHz each. The gNB, prior to performing the transmission in the downlink, performs for each subband $\mathbf{200}_1$ to $\mathbf{200}_4$ LBT so as to determine whether the respective subband is busy/occupied or free/non-occupied. In the example depicted in FIG. 4(*a*) the LBT performed by the gNB yields that subbands $\mathbf{200}_1$, $\mathbf{200}_3$ and $\mathbf{200}_4$ are free, while subband $\mathbf{200}_2$ is busy. Thus, for the wideband operation within the BWP 200 the gNB won the subbands $\mathbf{200}_1$, $\mathbf{200}_3$ and $\mathbf{200}_4$ for the transmission, while subband $\mathbf{200}_2$ is not won. Subband $200_2$ may not be available due to a transmission from a coexisting system, like the above-described IEEE 802.11 system. This is indicated in FIG. 4 by × indicating the LBT failure. Responsive to the LBT algorithm performed, the gNB selects subbands $200_1$, $200_3$ and $200_4$ for transmitting data in the downlink as is indicated by PDSCH #1 and PDSCH #2.

FIG. 4(*b*) shows an embodiment for transmitting in the uplink, for example by a UE. According to the wideband configuration to be used a BWP 200 is scheduled for the broadband operation of the UE, for example an 80 MHz wideband operation using again the four LBT subbands $200_1$ to $200_4$. The UE, initially, performs an LBT which yields that among the LBT subbands, the subband $200_2$ is busy or not free and, therefore, may not be used by the UE. In addition, it is assumed that the UE prefers to transmit in the uplink only in continuous/adjacent subbands, so that the UE in the example of FIG. 4(*b*) selects subbands $200_3$ and $200_4$ which, in accordance with the LBT algorithm, are free for transmitting in the uplink as is indicated by PUSCH #1. No transmission in the subband $200_1$ occurs, however, in case also a non-continuous transmission is possible or desired, additional data may be transmitted in subband $200_1$ which is also available.

As is described, for example, in RP-150271, "Status Report to TSG: Study on Licensed-Assisted Access to Unlicensed Spectrum," 3GPP RAN #67, March 2015), the LBT schemes in 3GPP RAN may be classified into four different categories:

- Category 1, CAT-1:
  - No LBT,
- Category 2, CAT-2:
  - LBT without random back-off (see FIG. 2),
- Category 3, CAT-3:
  - LBT with random back-off with fixed size of contention window (see FIG. 2),
- Category 4, CAT-4:
  - LBT with random back-off with variable size of contention window (see FIG. 2)

In FIG. 4, when performing a wideband operation within the supported or configured BWP 200 the channel occupancy time, COT, is initiated, e.g., by performing a CAT-4 LBT. Within a gNB-initiated COT (see FIG. 4(*a*)) the UE may use a CAT-2 LBT procedure to transmit a PUCCH or PUSCH. Similarly, for a UE initiated COT using CAT-4 LBT (see FIG. 4(*b*)), the gNB may use a CAT-2 LBT for transmitting within the UE-initiated COT a PDCCH or PDSCH. In either case, the gNB or the UE may indicate a maximum time the receiver may transmit within the $COT_{gNB}$ or $COT_{UE}$.

User devices for the above described wireless communication networks may be configured with configured grants, CGs, thereby providing resources that may be randomly utilized by the user devices whenever there is data to be transmitted. CGs avoid the package transmission delay for a scheduling request procedure and may increase the utilization ratio of allocated periodic radio resources. Different configured grant time domain resource allocation mechanisms exist in NR, referred to as type 1 CG and type 2 CG. A UE may be configured with CG(s) by RRC signaling at some time and the CG(s) may be periodically used by the UE. However, using CGs, for example due to their periodic nature, may lead to drawbacks in wideband operations using bands, some of which may be in the unlicensed spectrums and, therefore, only allow for a communication during the above-described channel occupancy time, COT, e.g. the COT of another entity, e.g., other UE(s) or other gNB(s), in the wireless communication system.

Figure 5:
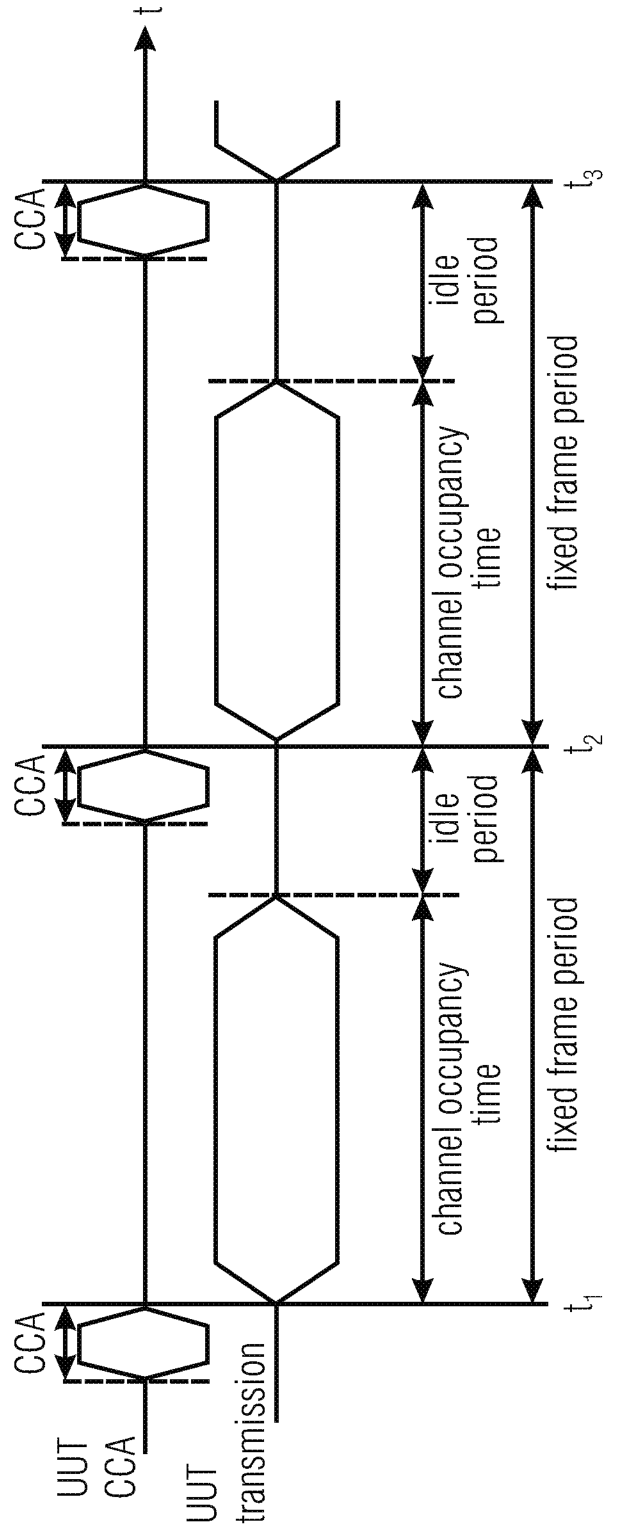
FIG. 5 illustrates an example of the timing for a frame-based equipment.

For example, when considering the regulations for the unlicensed 5 GHz band, and when considering a so-called frame-based equipment, FBE, device, there may be some problems when employing CGs. FBE is a channel access mechanism defined in EN 301.893 for allowing periodic access to a channel. FIG. 5 illustrates an example of the timing for a frame-based equipment. The periodicity is referred to as the fixed frame period illustrated in FIG. 5 which may be between 1 millisecond and 10 milliseconds. The UE may perform a fixed clear channel assessment, CCA, procedure as also illustrated in FIG. 5 in the top line, before each of the starting points T1, T2, T3 of a fixed frame period. In case CCA is successful, the UE may transmit for the fixed time period, which is the channel occupancy time, COT, that may be up to 95% of the fixed frame period. In case the CCA was not successful, the UE waits for the next fixed frame period. The FBE device is allowed to share its COT only for the current operating channel only within the current COT. Thus, in case of a FBE device, the COT of the device may only be shared when an explicit grant is issued within the COT. This may lead to problems for configured grants, since they are configured by RRC at some point in time and are periodically used by the UE. More specifically, in case a CG falls within a COT, the UE may automatically transmit on the CG opportunity in case this is available, which is in contradiction with the FBE requirements described above allowing the COT sharing only when an explicit grant within the same COT is given.

However, even for other devices, for example for a load based equipment, LBE device sharing the COT may be a problem. An LBE device may access the channel at any time after performing the CCA with random back-off and it is allowed to share its COT on the current operating channel without any condition regarding the time. Thus, initially it may appear that sharing the COT with a CG UE is not a problem, however, it has been found that even in such situations problems may occur because the CG opportunities within a COT may lead to the so-called hidden node issue to be avoided. More specifically, in case the CG falls into the uplink, UL, region of the gNB COT, the UE may not hear the transmitting other UEs during an LBT and transmit without noticing an ongoing transmission to the gNB which may result in additional interference.

Further, any device sharing a COT, in case of a CG transmission opportunity, TO, inside the COT, may be allowed to use the configured TO only if the transmission is granted by an activation or triggering signal by the device that initiated the COT. Thus, in case the COT initiator device is not sending an explicit or implicit grant/activation/triggering for the sharing device, the sharing device may not use the configured grants, i.e., the transmission opportunities for the configured grants are skipped within the COT.

A further issue with using CGs in the unlicensed bands may be that due to the channel access procedures for the communicating devices, for example the random back-off, even a periodic transmission, such as a CG, may collide with gNB transmissions from time to time. Under certain circumstances, the COT duration may extend up to 20 ms which may have a significant impact on the CG of a UE since the UE has to wait for 20 ms to obtain an empty time slot where it may transmit using its CG. However, since the starting point of a gNB COT may vary, an original CG configuration provided as a default may not be simply applied to a current COT structure.

The present invention provides improvements and enhancements in the wireless communication system addressing the above described problems. The wireless communication system may use one or more subbands, also referred to as channels or frequency bands of a NR carrier, wherein a frequency band includes a start frequency, an end frequency and all intermediate frequencies between the start and end frequencies. A subband may have a predefined bandwidth, like 20 MHz. When using a plurality of subbands, the operation is also referred to as a wideband operation.

Figure 1B:
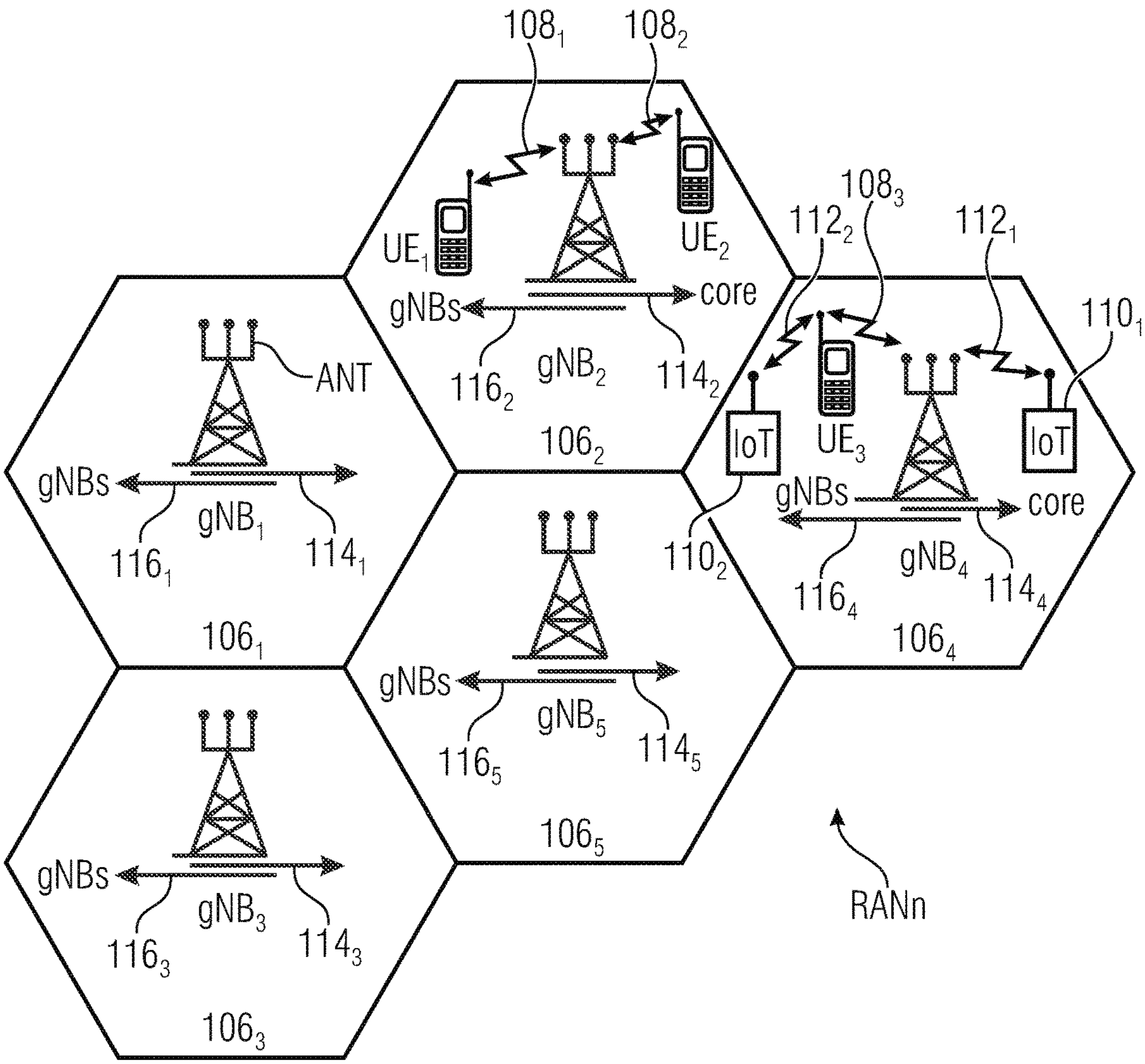
Figure 6:
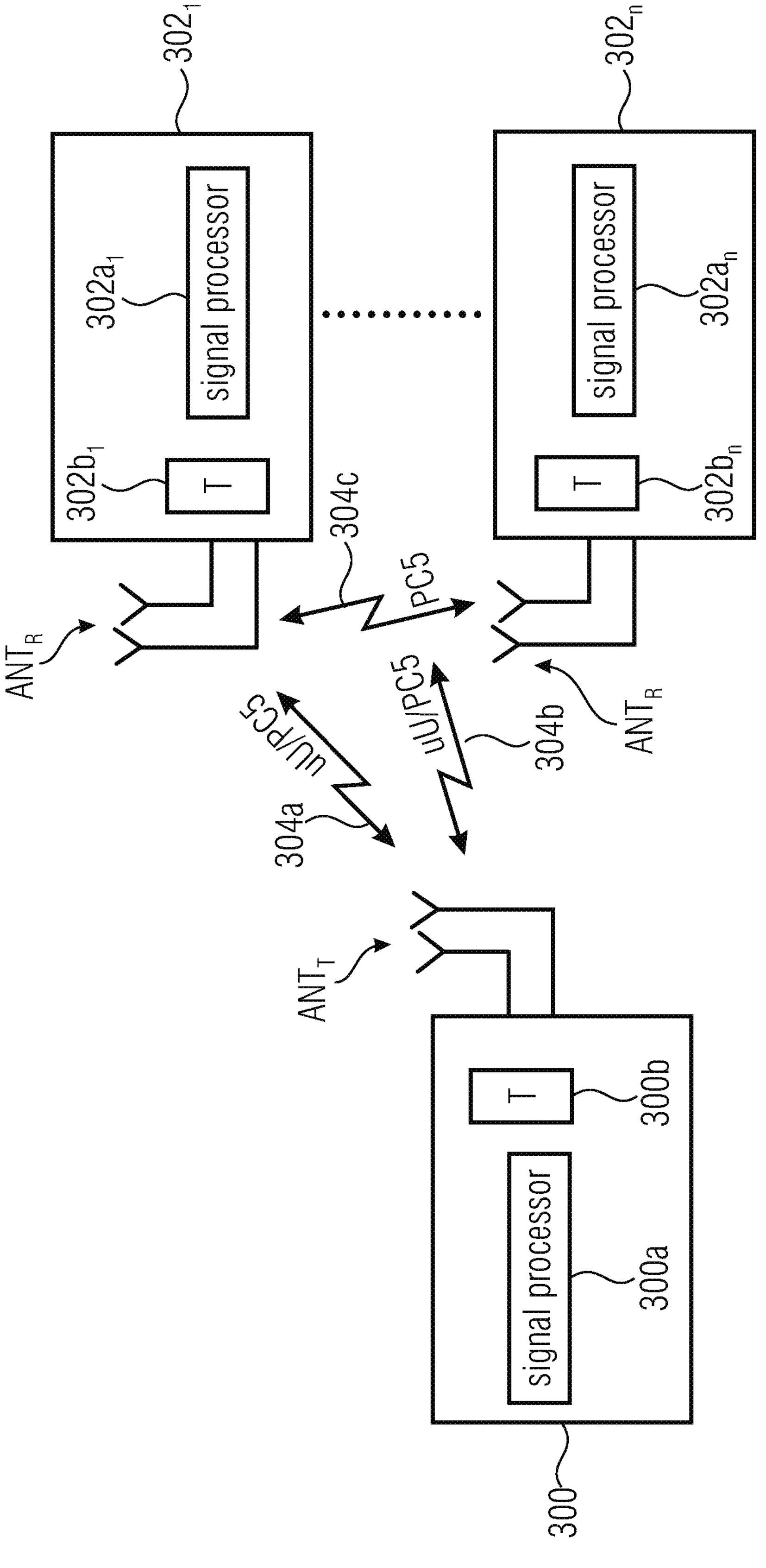
FIG. 6 is a schematic representation of a wireless communication system including a transmitter, like a base station, and one or more receivers, like user devices, UEs.

Embodiments of the present invention may be implemented in a wireless communication system as depicted in FIG. 1 including base stations and users, like mobile terminals or IoT devices. FIG. 6 is a schematic representation of a wireless communication system including a transmitter 300, like a base station, and one or more receivers $\mathbf{302}_1$ to $\mathbf{302}_n$, like user devices, UEs. The transmitter 300 and the receivers 302 may communicate via one or more wireless communication links or channels 304*a*, 304*b*, 304*c*, like a radio link. The transmitter 300 may include one or more antennas $ANT_T$ or an antenna array having a plurality of antenna elements, a signal processor 300*a* and a transceiver 300*b*, coupled with each other. The receivers 302 include one or more antennas $ANT_R$ or an antenna array having a plurality of antennas, a signal processor $\mathbf{302}a_1$, $\mathbf{302}a_n$, and a transceiver $\mathbf{302}b_1$, $\mathbf{302}b_n$ coupled with each other. The base station 300 and the UEs 302 may communicate via respective first wireless communication links 304*a* and 304*b*, like a radio link using the Uu interface, while the UEs 302 may communicate with each other via a second wireless communication link 304*c*, like a radio link using the PC5 interface. When the UEs are not served by the base station, are not be connected to a base station, for example, they are not in an RRC connected state, or, more generally, when no SL resource allocation configuration or assistance is provided by a base station, the UEs may communicate with each other over the sidelink. The system, the one or more UEs 302 and the base stations 300 may operate in accordance with the inventive teachings described herein.

User Device

The present invention provides a user device, UE, for a wireless communication system,

- wherein the UE is served by a base station and is to use one or more frequency bands for a communication with one or more entities, e.g., other UE(s) or other gNB(s), in the wireless communication system, wherein some or all of the plurality of frequency bands are unlicensed frequency bands on which a communication is allowed for a certain transmission time (COT) responsive to a successful channel access procedure e.g. Listen-Before-Talk, LBT,
- wherein the UE is configured, e.g., using an RRC signaling, with one or more configured grant, CG, configurations so as to allow the UE to perform one or more CG transmissions, and
- wherein responsive to detecting a COT and a potential collision of a CG transmission with the COT, e.g. the COT of another entity, e.g., other UE(s) or other gNB(s), in the wireless communication system, the UE is to deactivate or back off the CG transmission.

In accordance with embodiments, the UE is to scan the information from the BS regarding one or more unlicensed frequency bands used by the BS and the COT length so as to derive a potential collision of a CG transmission with the COT.

In accordance with embodiments, one or more CG configurations include one or multiple CG opportunities, and wherein, responsive to detecting a COT, the UE is to automatically deactivate all CG opportunities colliding with the COT, and to perform the channel access procedure only for CG opportunities which are outside the COT, if any.

In accordance with embodiments, one or more CG configurations include one or more CG opportunities, and wherein, responsive to detecting a COT, the UE is to assume all channel access procedure observation slots colliding with the COT being busy, and to perform a channel access procedure back off procedure accordingly.

In accordance with embodiments, one or more CG configurations include one or more CG opportunities, and wherein, responsive to detecting a COT, the UE is to automatically deactivate all CG opportunities except a subset of CG opportunities which are indicated to be used within the COT.

In accordance with embodiments, one or more CG configurations include one or more CG opportunities, and wherein, responsive to detecting a COT, the UE is to automatically deactivate all CG opportunities, at least for the time of the COT, and switch to one or more different CG configurations or in-COT CG configurations for use within the COT.

In accordance with embodiments, one or more CG configurations include one or multiple CG opportunities, and in the case the CG opportunities fully or partly apply to a COT, the UE is to

- deactivate the whole CG configuration, if at least one CG opportunity is within the COT, or
- deactivate the whole CG configuration, if at least some of the CG opportunities are within the COT, or
- deactivate the whole CG configuration, if all CG opportunities are within gNB COT.

In accordance with embodiments, responsive to deactivating the whole CG configuration, the UE is to change to a configured or preconfigured within-COT CG procedure, the pre-configured within-COT CG procedure specifying for example certain resources within the COT to be used for a CG transmission.

In accordance with embodiments, the UE is to read information provided from the BS which indicates whether the current COT is a frame-based equipment, FBE, COT or a load-based equipment, LBE, COT, and to deactivate the CG transmission only if the current COT is a FBE COT.

In accordance with embodiments, responsive to deactivating the CG transmission, the UE is to change to a configured or preconfigured within-FBE-COT CG procedure, the pre-configured within-FBE-COT CG procedure specifying for example certain resources within the FBE-COT to be used for a CG transmission and/or involving an explicit CG activation signaling within the COT.

In accordance with embodiments, the UE is configured with one or more additional CG resources across one or more of the plurality of frequency bands, and wherein, responsive to detecting a COT and a potential collision of a CG transmission with the COT, the UE is to perform the CG transmission using one or more of the additional CG resources within one or more failed frequency bands, or outside a COT, e.g. on a different frequency band, or within a licensed band.

In accordance with embodiments, is to perform a CG transmission within the COT, e.g. the COT of another entity, e.g., other UE(s) or other gNB(s), in the wireless communication system, only in response to receiving an activation signaling or grant from a certain entity, e.g., other UE(s) or other gNB(s), in the wireless communication system.

The present invention provides a user device, UE, for a wireless communication system, wherein the UE is served by a base station and is to use one or more frequency bands for a communication with one or more entities, e.g., other UE(s) or other gNB(s), in the wireless communication system, wherein some or all of the plurality of frequency bands are unlicensed frequency bands on which a communication is allowed for a certain transmission time (COT) responsive to a successful channel access procedure e.g. Listen-Before-Talk, LBT, wherein the UE is configured, e.g., using an RRC signaling, with one or more configured grant, CG, configurations so as to allow the UE to perform one or more CG transmissions, wherein the UE is to perform a CG transmission within the COT, e.g. the COT of another entity, e.g., other UE(s) or other gNB(s), in the wireless communication system, only in response to receiving an activation signaling or grant from a certain entity, e.g., other UE(s) or other gNB(s), in the wireless communication system.

In accordance with embodiments, the UE is to receive the activation signaling as part of control information, e.g., DCI, SCI, transmitted in a control region, e.g., PDCCH or PSCCH of one or more of the frequency bands, e.g. using a certain RNTI or an explicit field in the DCI for indicating an activation of a specific CG configuration, a group of CG configurations or CG configurations within a certain time/frequency.

In accordance with embodiments, the activation signaling has one or more of the following functionalities:

an authorization grant for an originally configured CG transmission, a control signaling triggering a change from an originally configured CG transmission to a pre-configured within-COT CG procedure, the pre-configured within-COT CG procedure specifying for example certain resources within the COT to be used for a CG transmission, a grant assigning new resources for one or more CG configurations within the COT.

In accordance with embodiments, the activation signaling is a group signaling indicating a pre-configured subset or all CG configurations for a plurality of UEs or for a group of UEs, and wherein the UE is to receive the group signaling as part of group control information transmitted in a control region, e.g., GC-PDCCH or GC-PSCCH, of one or more of the frequency bands.

In accordance with embodiments, the group signaling has one or more of the following functionalities:

an authorization grant for an originally configured CG transmission, a control signaling triggering a change from an originally configured CG transmission to a pre-configured within-COT CG procedure, the pre-configured within-COT CG procedure specifying for example certain resources within the COT to be used for a CG transmission, a grant assigning new resources for one or more CG configurations within the COT, wherein each UE in the group signaling.

is pre-configured or configured with a subset of the new resources to be used for the UE's CG transmission, or performs a channel access procedure on the new set of resources.

In accordance with embodiments, the activation signaling is an in-COT CG-activation that operates for both type-1 CG and type-2 CG configurations, wherein in case of a type-1 CG configuration the UE is configured, e.g., using an RRC signaling, with a CG configuration information element, IE, indicating the in-COT CG-activation to be active or inactive, e.g., a NR rrc_configureGrantConfiguration IE may indicate the in-COT CG-activation to be true or false, and/or with a set of resources within a COT to be used for the in-COT procedure, the UE is to wait for the in-COT CG-activation, in case the in-COT CG-activation is active, and the UE is to receive the in-COT activation via a DCI; and in case of type-2 CG configurations the UE is configured, e.g., using an RRC signaling, with a CG configuration information element, IE, and is to receive a DCI signaling to configure a CG-activation to be active or inactive, the UE is to wait for the in-COT CG-activation, in case the in-COT CG-activation active, and the UE is to receive the in-COT activation via the DCI or via a separate in-COT activation signaling.

The present invention provides a user device, UE, for a wireless communication system, wherein the UE is served by a base station and is to use one or more frequency bands for a communication with one or more entities, e.g., other UE(s) or other gNB(s), in the wireless communication system, wherein some or all of the plurality of frequency bands are unlicensed frequency bands on which a communication is allowed for a certain transmission time (COT) responsive to a successful channel access procedure, e.g., Listen-Before-Talk, LBT, wherein the UE is configured, e.g., using an RRC signaling, with one or more out-COT configured grant, CG, configurations so as to allow the UE to perform one or more CG transmissions outside a gNB COT by initiating its own COT, and one or more in-COT configured grant, CG, configurations so as to allow the UE to perform one or more CG transmissions within a gNB COT.

In accordance with embodiments, the UE is to be semi-statically or dynamically configured within a radio frame with the in-COT CG configurations, wherein the in-COT CG configurations may be stretched over time or over frequency or code domains.

In accordance with embodiments, the UE is configured using a semi-static signaling, e.g., an RRC signaling, and wherein an in-COT CG configuration includes one or more of the following parameters:

a relative or an absolute time within the COT, e.g. at an end of the COT, an interlace configuration, a transmission duration, a frequency or subband configuration, a channel access procedure duration or priority or category.

In accordance with embodiments, the UE is configured using a dynamic signaling using control information, e.g., DCI, SCI, transmitted in a control region, e.g., PDCCH or PSCCH, of one or more of the frequency bands, and wherein the UE is to employ a certain in-COT CG configuration explicitly indicated in the control information, or the UE is to match one or more predefined transmission parameters associated with an in-COT CG transmission and included in the control information with transmission parameters of the one or more in-COT CG configurations so as to determine a certain in-COT CG configuration to be employed.

In accordance with embodiments, the UE is to use a CAT-2 LBT and/or interleaved-OFDMA in order to perform an interlaced transmission within the COT.

In accordance with embodiments, the UE is to apply an in-COT CG configuration only in response to receiving an activation signaling or grant from a certain entity, e.g., other UE(s) or other gNB(s), in the wireless communication system.

Base Station

The present invention provides a base station, BS, for a wireless communication system, wherein the BS is to serve one or more UEs and is to use one or more frequency bands for a communication with the one or more UEs in the wireless communication system, wherein some or all of the plurality of frequency bands are unlicensed frequency bands on which a communication is allowed for a certain transmission time (COT) responsive to a successful channel access procedure, e.g., Listen-Before-Talk, LBT, wherein the BS is to configure, e.g., using an RRC signaling, the one or more UEs with one or more configured grant, CG, configurations so as to allow the UEs to perform one or more CG transmissions, and wherein the BS is to signal to the one or more UEs one or more unlicensed frequency bands used by the BS and the COT length so as to allow the UEs to deactivate or back off the CG transmission responsive to detecting a potential collision of a CG transmission with the COT, e.g. the COT of another entity, e.g., other UE(s) or other gNB(s), in the wireless communication system.

The present invention provides a base station, BS, for a wireless communication system, wherein the BS is to serve one or more UEs and is to use one or more frequency bands for a communication with the one or more entities in the wireless communication system, wherein some or all of the plurality of frequency bands are unlicensed frequency bands on which a communication is allowed for a certain transmission time (COT) responsive to a successful channel access procedure, e.g., Listen-Before-Talk, LBT, wherein BS is to configure, e.g., using an RRC signaling, the one or more UEs with one or more configured grant, CG, configurations so as to allow the UEs to perform one or more CG transmissions, wherein the BS is to send to the one or more UEs an activation signaling or grant enabling a UE to perform a CG transmission within a COT, e.g. the COT of another entity, e.g., other UE(s) or other gNB(s), in the wireless communication system.

The present invention provides a base station, BS, for a wireless communication system, wherein the BS is to serve one or more UEs and is to use one or more frequency bands for a communication with the one or more UEs in the wireless communication system, wherein some or all of the plurality of frequency bands are unlicensed frequency bands on which a communication is allowed for a certain transmission time (COT) responsive to a successful channel access procedure, e.g., Listen-Before-Talk, LBT, wherein the BS is to configure, e.g., using an RRC signaling, the one or more UEs with one or more out-COT configured grant, CG, configurations so as to allow the UE to perform one or more CG transmissions outside a COT, e.g. the COT of another entity, e.g., other UE(s) or other gNB(s), in the wireless communication system, and one or more in-COT configured grant, CG, configurations so as to allow the UE to perform one or more CG transmissions within a COT, e.g. the COT of another entity, e.g., other UE(s) or other gNB(s), in the wireless communication system.

System

The present invention provides a wireless communication system, comprising one or more UEs and one or more BSs, wherein the one or more UEs comprise a UE in accordance with the present invention and/or the one or more BSs comprise a BS in accordance with the present invention.

In accordance with embodiments, the UE comprises one or more of a mobile terminal, or stationary terminal, or cellular IoT-UE, or vehicular UE, or vehicular group leader (GL) UE, an IoT or narrowband IoT, NB-IoT, device, or a ground based vehicle, or an aerial vehicle, or a drone, or a moving base station, or road side unit, or a building, or any other item or device provided with network connectivity enabling the item/device to communicate using the wireless communication network, e.g., a sensor or actuator, and/or the BS comprises one or more of a macro cell base station, or a small cell base station, or a central unit of a base station, or a distributed unit of a base station, or a road side unit, or a UE, or a group leader (GL), or a relay, or a remote radio head, or an AMF, or an SMF, or a core network entity, or mobile edge computing entity, or a network slice as in the NR or 5G core context, or any transmission/reception point, TRP, enabling an item or a device to communicate using the wireless communication network, the item or device being provided with network connectivity to communicate using the wireless communication network.

Method

The present invention provides a method for operating a wireless communication system, the method comprising:

serving a UE a base station so as to use one or more frequency bands for a communication with one or more entities, e.g., other UE(s) or other gNB(s), in the wireless communication system, wherein some or all of the plurality of frequency bands are unlicensed frequency bands on which a communication is allowed for a certain transmission time (COT) responsive to a successful channel access procedure e.g. Listen-Before-Talk, LBT, wherein the UE is configured, e.g., using an RRC signaling, with one or more configured grant, CG, configurations so as to allow the UE to perform one or more CG transmissions, and responsive to detecting a COT and a potential collision of a CG transmission with the COT, e.g. the COT of another entity, e.g., other UE(s) or other gNB(s), in the wireless communication system, the UE, deactivating or backing off the CG transmission.

The present invention provides a method for operating a wireless communication system, the method comprising:

serving a UE by a base station so as to use one or more frequency bands for a communication with one or more entities, e.g., other UE(s) or other gNB(s), in the wireless communication system, wherein some or all of the plurality of frequency bands are unlicensed frequency bands on which a communication is allowed for a certain transmission time (COT) responsive to a successful channel access procedure e.g. Listen-Before-Talk, LBT, wherein the UE is configured, e.g., using an RRC signaling, with one or more configured grant, CG, configurations so as to allow the UE to perform one or more CG transmissions, performing, by the UE, a CG transmission within the COT, e.g. the COT of another entity, e.g., other UE(s) or other gNB(s), in the wireless communication system, only in response to an activation signaling or a grant from a certain entity, e.g., other UE(s) or other gNB(s), in the wireless communication system.

The present invention provides a method for operating a wireless communication system, the method comprising:

serving a UE by a base station so as to one or more frequency bands for a communication with one or more entities, e.g., other UE(s) or other gNB(s), in the wireless communication system, wherein some or all of the plurality of frequency bands are unlicensed frequency bands on which a communication is allowed for a certain transmission time (COT) responsive to a successful channel access procedure, e.g., Listen-Before-Talk, LBT, and configuring the UE, e.g., using an RRC signaling, with one or more out-COT configured grant, CG, configurations so as to allow the UE to perform one or more CG transmissions outside a gNB COT by initiating its own COT, and one or more in-COT configured grant, CG, configurations so as to allow the UE to perform one or more CG transmissions within a gNB COT.

Computer Program Product

The present invention provides a computer program product comprising instructions which, when the program is executed by a computer, causes the computer to carry out one or more methods in accordance with the present invention.

Aspect 1

In accordance with embodiments of a first aspect of the present invention, an explicit grant or activation signal for the configured grant, CG, is provided.

In accordance with embodiments, a UE specific activation is employed and the UE performs a CG transmission only in response to receiving an activation signaling or grant from the gNB or another network entity like another UE in case of a sidelink, SL, communication, a roadside unit, RSU, a drone, a WIFI device, a relay device or the like. The activation signaling refers to a certain CG configuration and, upon receipt, allows the UE to perform the CG transmission. Thus, the above mentioned problems associated with, e.g., FBE, LBE of other devices are addressed in that, in accordance with embodiments of the first aspect, the UE is receiving the grant that may be given to perform a transmission, for example during the COT, e.g. the COT of another entity, e.g., other UE(s) or other gNB(s), in the wireless communication system.

The signaling may be transmitted using a DCI in the PDCCH or, in case of a SL communication, with a SCI in the PSCCH. For example, a certain RNTI may be used for indicating the activation of a specific CG configuration. The activation signaling may have one or more of the following functionalities:

an authorization grant for the originally configured CG transmission, a control signaling triggering the change to a pre-configured within-COT CG procedure, for example to use preconfigured resources within the COT, a grant assigning new resources for a CG configuration within the COT.

In accordance with other embodiments of the first aspect of the present invention, the explicit grant or activation signaling for performing a CG may be obtained via a group activation. For example, a group signaling, like a group common-PDCCH, GC-PDCCH, or a group cast on a group common side link control channel, SCI, may be transmitted in order to activate a pre-configured subset or all CG configurations for some or all UEs of a group. The activation signaling may have one or more of the following functionalities:

an authorization grant for the originally configured CG transmission, a control signaling triggering the change to a pre-configured within-COT CG procedure, for example to pre-configured resources within the COT, a grant assigning a new set of resources for a CG configuration within the COT, and each UE may know from a pre-configuration which subset to use while, in accordance with other examples, each UE may perform LBT or random access on the new set of resources so as to obtain resources for the CG transmission.

The activation signaling, in accordance with embodiments, operates for type 1 CGs and type 2 CGs. In case of a type-1 CG, the RRC signaling configures the transmission period, the transmission offset and the other CG information. Later, once a UE, or a group of UEs, that has been considered with type-1 configured grants, and a transmission opportunity, TO, occurs within a gNB COT, the UE needs or expects the activation signal before the TO inside the COT. The in-COT CG-activation may be configured in the information element used during RRC signaling, for example, it may be indicated that the in-COT CG-activation is active or inactive, for example by setting a corresponding field in the NR rrc_configuredGrantConfiguration IE to be true or false. In case the in-COT CG-activation is set to be active or true via the RRC signaling, the UE may receive the in-COT activation via a DCI or a SCI.

In case of type-2 CG, the RRC configuration may configure the periodicity of the TOs while the time offset and the activation signaling may be configured via DCI or SCI signaling. Then, the in-COT CG-activation may be configured as described above, for example to be active or inactive by setting a field within the configuration information element to be true or false, and in case the activation signaling is set, i.e., it is configured to be true, the UE has to wait for the in-COT CG-activation before transmitting on the TO within the COT. In accordance with examples, in type-2 CG, the in-COT activation to be sent via the DCI or the SCI may reuse the CG type-2 activation signaling also for the in-COT activation, and in other examples the CG type-2 activation signaling may only be used for setting the time offset and the frequency resources while a separate in-COT activation signaling may be used for activating the TO within the COT.

Thus, embodiments of the first aspect of the present invention avoid the problems described above that CGs may not be employed when sharing COT as, in accordance with the present invention, for performing the CG transmission within a COT the UE receives an explicit activation signal allowing the CG transmission.

Aspect 2

In accordance with embodiments of a second aspect of the present invention, different CG configurations are provided to be used within an outside a COT, like a gNB COT. More specifically, in accordance with embodiments a UE may be configured with two different configurations, explicitly or implicitly, one of which is to be used within the gNB COT or the COT of another entity, e.g., other UE(s), and the other one is to be used outside the gNB COT.

To address the above described issues with conventional-technology approaches, e.g., that an initial CG configuration may not be applied to a current COT structure, in accordance with embodiments of the second aspect, different configurations for CGs to be performed within and outside a gNB COT are provided or indicated to the UE. In other words, in addition to the default CG configuration, an additional configuration is provided to be used inside the COT. For example, the additional configuration may indicate dedicated CG resources within a COT to be used for the CG TOs.

Figure 7A:
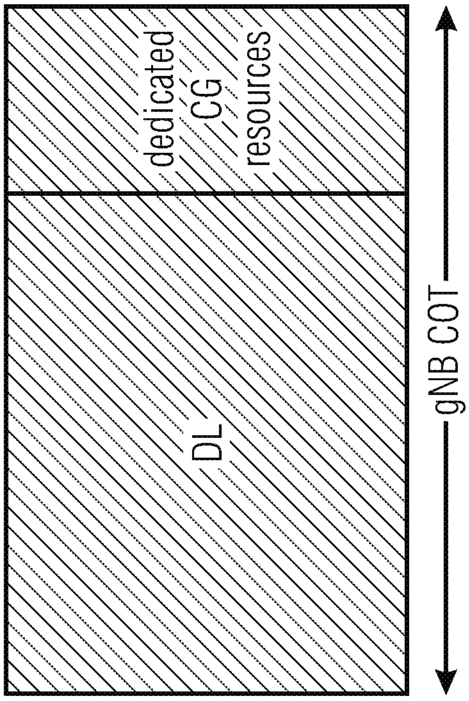
FIG. 7*a-b* illustrates embodiments using dedicated CG resources within a COT.
Figure 7B:
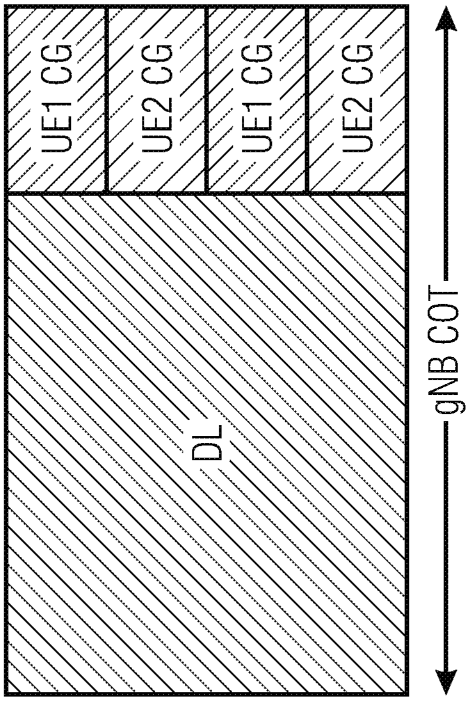

FIG. 7 illustrates two examples for dedicated CG resources within a COT. A part of the downlink resources of a gNB COT may be employed for CG transmissions from one or more UEs sharing the COT of the gNB. In FIG. 7(*a*) the dedicated CG resources are shown at the end of the COT which may be used for CG transmissions by a plurality of UEs being served by the gNB. FIG. 7(*b*) illustrates a similar configuration in which, however, the resources dedicated for the CGs are further allocated to specific UEs served by the base station so that the UE1 and the UE2 have fixed resources to be used for their CG transmissions.

It is noted that the invention is not limited to embodiments in which a UE shares a COT of a gNB as illustrated in FIG. 7, rather the inventive approach equally applies for the uplink spectrum or the SL spectrum. For example, the COT illustrated in FIG. 7 may also be a COT of a UE performing a SL communication with one or more other UEs and in the SL COT respective resources may be dedicated to CG transmissions of other UEs. In accordance with other embodiments, the uplink spectrum of a UE may also be provided with dedicated parts to be used by CG transmissions.

The additional configuration, which may be referred to as an in-COT configuration, may be semi-statically or dynamically configured within a radio frame and may be stretched over time and/or over frequency and/or over code domains. In case of a semi-static configuration, the UE may be provided with the additional configuration using RRC signaling so as to configure the CG transmission within a COT, for example a gNB COT. This configuration may include one or more of the following parameters:

- a relative or absolute time within the COT where the CT transmission resources may be found, for example, towards the end of the COT as illustrated in FIG. 7 while, in accordance with other embodiments, the CG resources may also be provided at other time, either more to the center of the COT or closer to the beginning of the COT.
- an interlace configuration
- a frequency/subband configuration
- a LBT duration/priority.

In case of a dynamic configuration, the additional configuration may be provided using dynamic signaling, such as a DCI in the PDCCH. The DCI may either explicitly reference a certain CG configuration or may implicitly refer to a certain CG configuration. When implicitly referring to the CG configuration, the UE may match certain parameters from the DCI with respective parameters of the CG configurations so as to find the CG configuration matching the parameters indicated in the DCI, like a transmission size, CG configuration ID, timing, HARQ process ID and the like. In case a dynamic grant is received, which matches a certain CG configuration, LBT is performed only for the dynamic grant, and the actually default CG occasion is skipped.

Figures 8A, 8B:
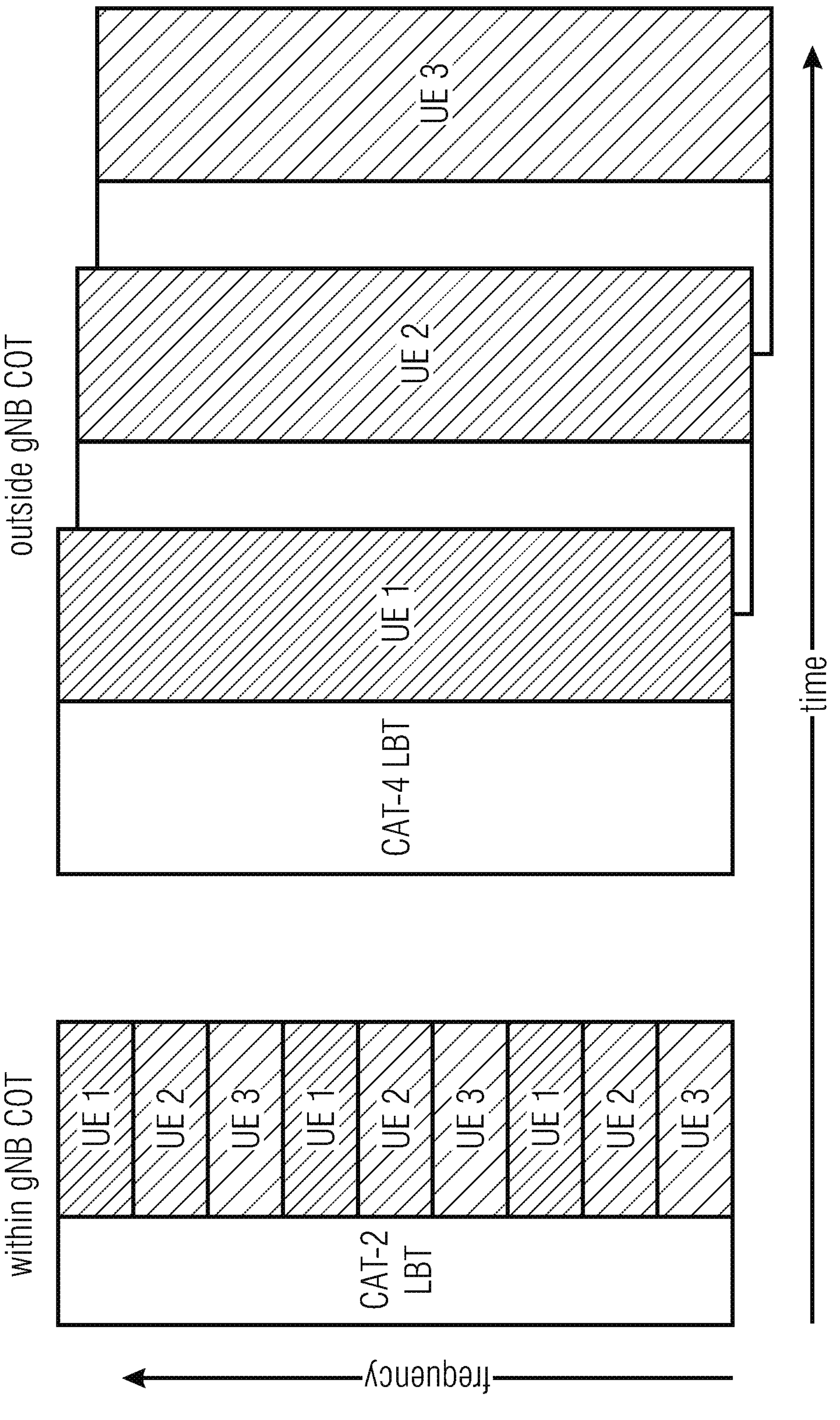
FIG. 8*a-b* illustrates embodiments using interlaced CGs within and outside a gNB COT.

In accordance with yet further embodiments, CGs may be interlaced with the gNB COT. For example, outside a gNB COT, a UE may perform a CAT-4 LBT with a random back-off so as to initiate a CG. The CG may span the entire transmission bandwidth and multiplexing between different CG UEs may be possible in a TDM manner. Within a gNB COT, interlaced transmissions offer high multiplexing capabilities using CAT-2 LBT. Therefore, in accordance with embodiments of the second aspect, a CAT-2 LBT is used in order to perform an interlaced transmission with the gNB COT. FIG. 8 illustrates interlaced CGs within a gNB COT (see FIG. 8(*a*)) and outside the gNB COT (see FIG. 8(*b*)). As described above, within the COT the respective CGs for the different users, like UE1, UE2 and UE3, are is interlaced in a FDM manner as opposed to the interlacing outside the GOT where it is done in the TDM manner.

In accordance with further embodiments, interleaving may be achieved using (block)-interleaved-OFDMA (IF-DMA). Moreover, CAT-2 LBT UEs may use certain CDMA codes when transmitting within the gNB COT.

The above described embodiments of the second aspect of the present invention may be combined with the embodiments of the first aspect of the present invention so that the additional CG configuration to be used within the COT may be employed only upon an activating, for example upon receiving an activation signaling as described above with regard to the first aspect.

Aspect 3

In accordance with embodiments of a third aspect of the present invention, an automatic partial or full deactivation of a CG is employed, for example responsive to detecting a COT. For example, in response to detecting a gNB COT (FBE or LBE), the UE may deactivate or back off its CG transmission in case a potential collision with the gNB COT is detected. The UE may scan information from the gNB regarding the operating channel and the COT length, and from this information the UE may derive a potential collision of a CG transmission to be performed by the UE with the gNB COT.

In accordance with further embodiments of the third aspect of the present invention, a CG configuration may include multiple CG opportunities, and responsive to detecting a gNB COT, the UE may automatically deactivate all CG opportunities that are expected to collide with the gNB COT and to perform only CCA for those CG opportunities which are outside the gNB COT, if any. In case the CG opportunities partly or fully apply to the gNB COT, the UE may apply different behaviors which are described below.

Figure 9:
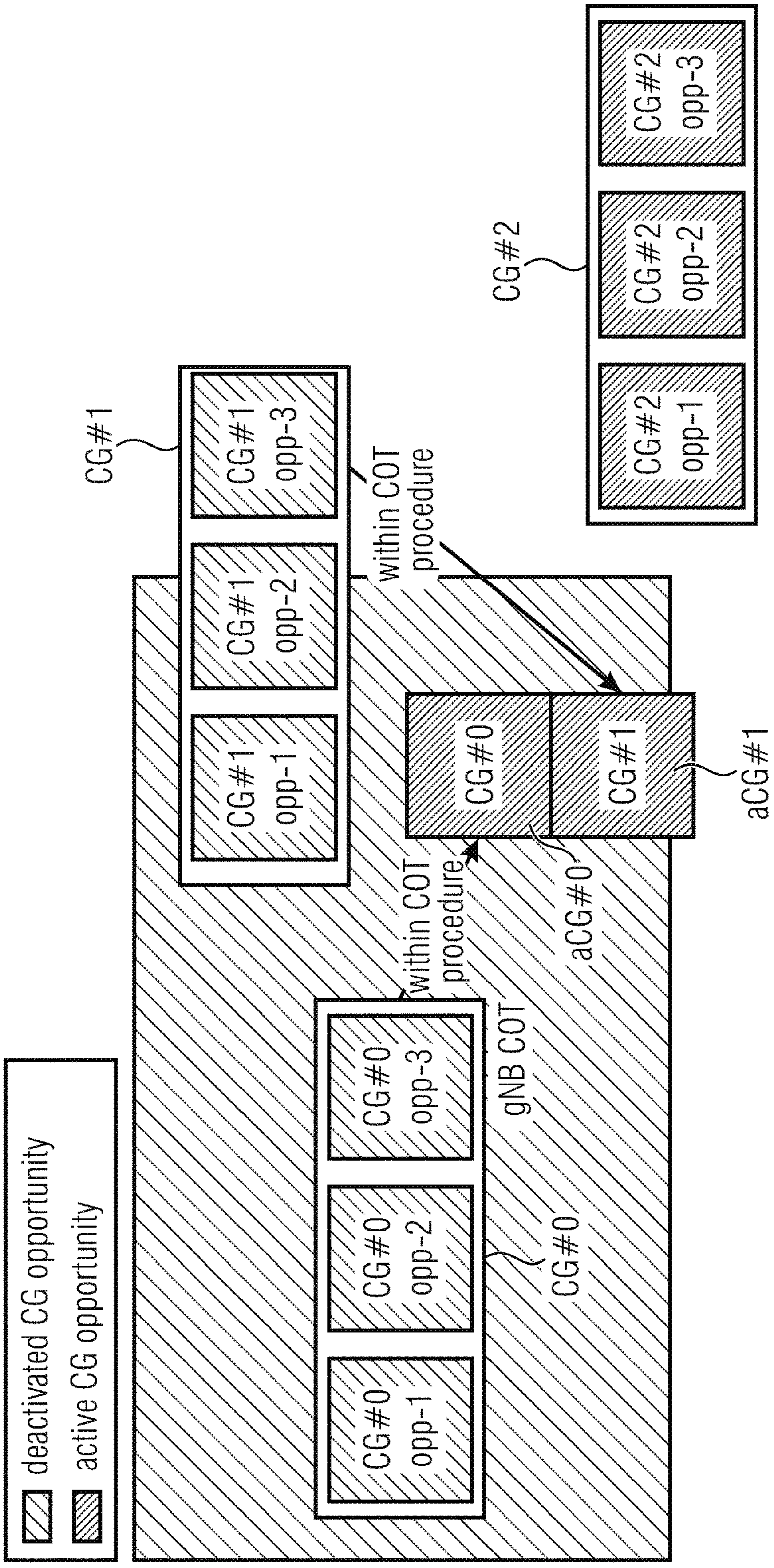
FIG. 9 illustrates an embodiment deactivating all CG opportunities in case at least one CG opportunity is within a gNB COT.

In accordance with embodiments, the UE may deactivate the entire or whole CG opportunities if at least one opportunity is within the gNB COT. FIG. 9 illustrates the deactivation of all CG opportunities in case at least one opportunity is within the gNB COT. FIG. 9 illustrates the gNB COT and three CG configurations CG #0, CG #1 and CG #2 each including three CG opportunities opp-1, opp-2 and opp-3. In accordance with this embodiment, all CG opportunities opp-1, opp-2 and opp-3 of CG configurations CG #0 and CG #1 are deactivated because all of the opportunities of CG configurations CG #0 and two of the opportunities of the CG configuration CG #1 are within the gNB COT. On the other hand, none of the opportunities of the CG configuration CG #2 is within the gNB COT so that all opportunities of CG #2 remain activated.

In accordance with further embodiments, the UE may deactivate the entire or whole CG opportunities according to previously mentioned criteria except those which are flagged to support in-COT operation. The gNB may provide this flag via semi static configuration, such as RRC, or it may be implicitly derived. For example, one or more CG opportunities lying first in time may be supporting in-COT operation by default. Hence, the UE automatically deactivates only the other CG opportunities responsive to detecting a collision with a gNB COT.

In a further embodiment, only a subset of CG opportunities of the CG configuration which are flagged implicitly, e.g. order in time, or explicitly, e.g. RRC signaling, as in-COT CG opportunities are used in a gNB COT. For example, all CG opportunities except the first one in time are deactivated responsive to detecting a collision with a gNB COT. Hence, the gNB knows where it may expect a CG transmission within its COT structure.

In accordance with another embodiment, the functionality may be that within the COT, also referred to as in-COT, a different configuration is applied, at least for the time of the COT. For example, responsive to detecting a COT, the UE may to automatically deactivate all CG opportunities, at least for the time of the COT, and switch to one or more different CG configurations or in-COT CG configurations for use within the COT.

In accordance with further embodiments, responsive to deactivating a CG configuration, the UE may change to a within-COT procedure. For example, the UE may be configured with additional CG configurations to be used within the COT that are illustrated in FIG. 9 as aCG #0 and aCG #1. For example, the additional configurations may be configured in accordance with embodiments of aspect 2 described above.

In accordance with other embodiments, the entire CG configuration may be deactivated in case a certain number of CG opportunities, like k, K=1, 2, 3, . . . , opportunities, are within the COT.

Figure 10:
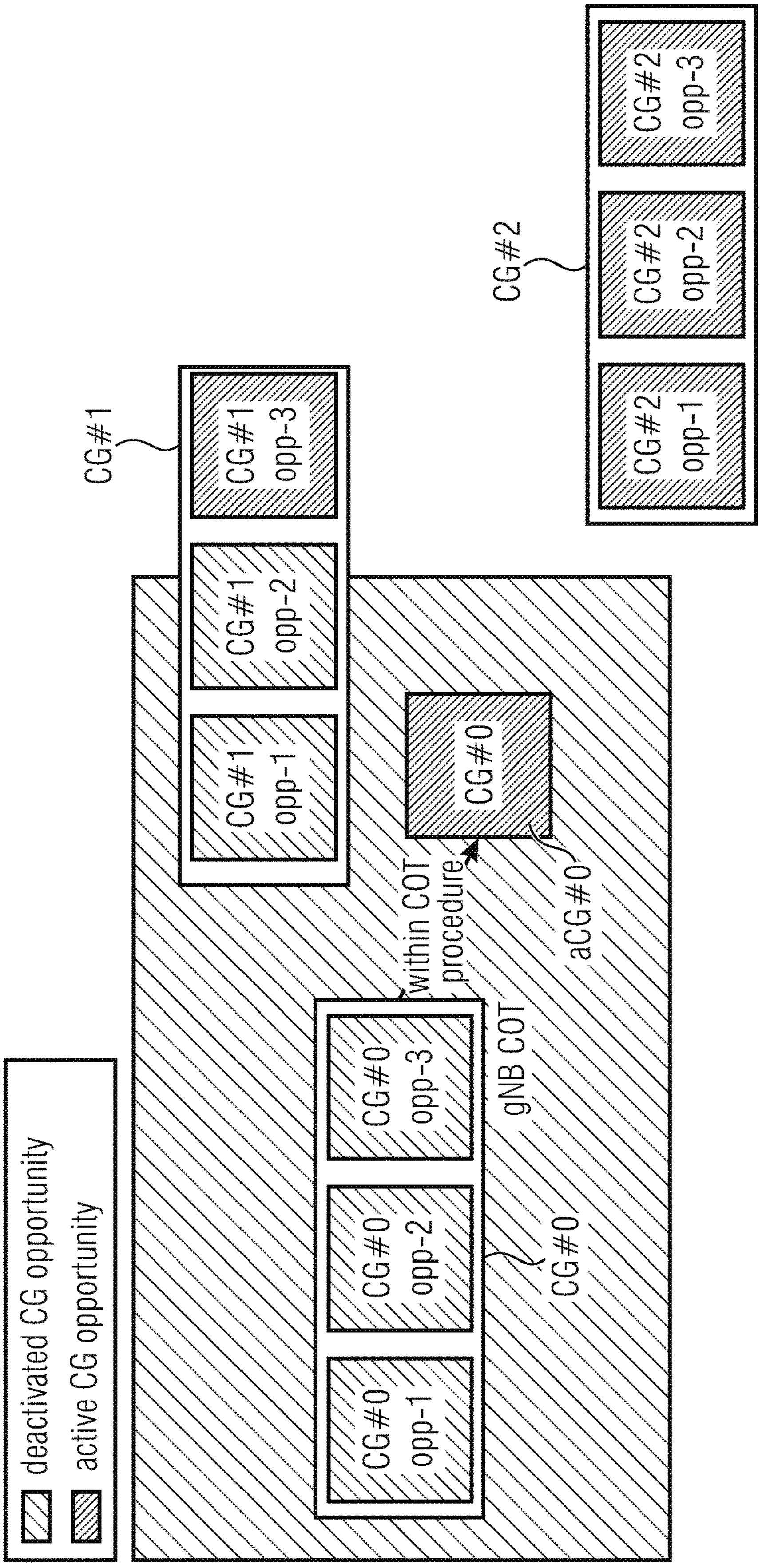
FIG. 10 illustrates an embodiment deactivating all CG opportunities in case all CG opportunities are within a gNB COT.

In accordance with yet further embodiments, the whole or entire CG configuration may be deactivated in case all opportunities are within the gNB COT as is illustrated in FIG. 10. FIG. 10 is similar to FIG. 9 and illustrates the three CG configurations CG #0, CG #1 and CG #2. In the embodiment depicted in FIG. 10, only for the CG configuration CG #0, all opportunities opp-1 to opp-3 are within the COT so that the whole or entire CG configuration CG #0 is deactivated. The opportunities for CG configuration CG #1 are not all inside the COT. Actually, only opportunities opp-1 and opp2 are within the COT, while opportunity opp-3 is outside the COT. Therefore, in accordance with this embodiment, only the opportunities opp-1 and opp-2 of CG configuration CG #1 are deactivated; however, opportunity opp-3 remains active. Like in FIG. 9, all opportunities of CG #2 are active because all of them are outside the COT. In accordance with further embodiments, in a similar way as is described above with reference to FIG. 9, in case an entire CG configuration is deactivated, like CG #0, a within-COT procedure may be applied, like an additional within-COT configuration, aCG #0, which may be provided in accordance with embodiments described above with reference to the third aspect of the present invention.

Figure 11A:
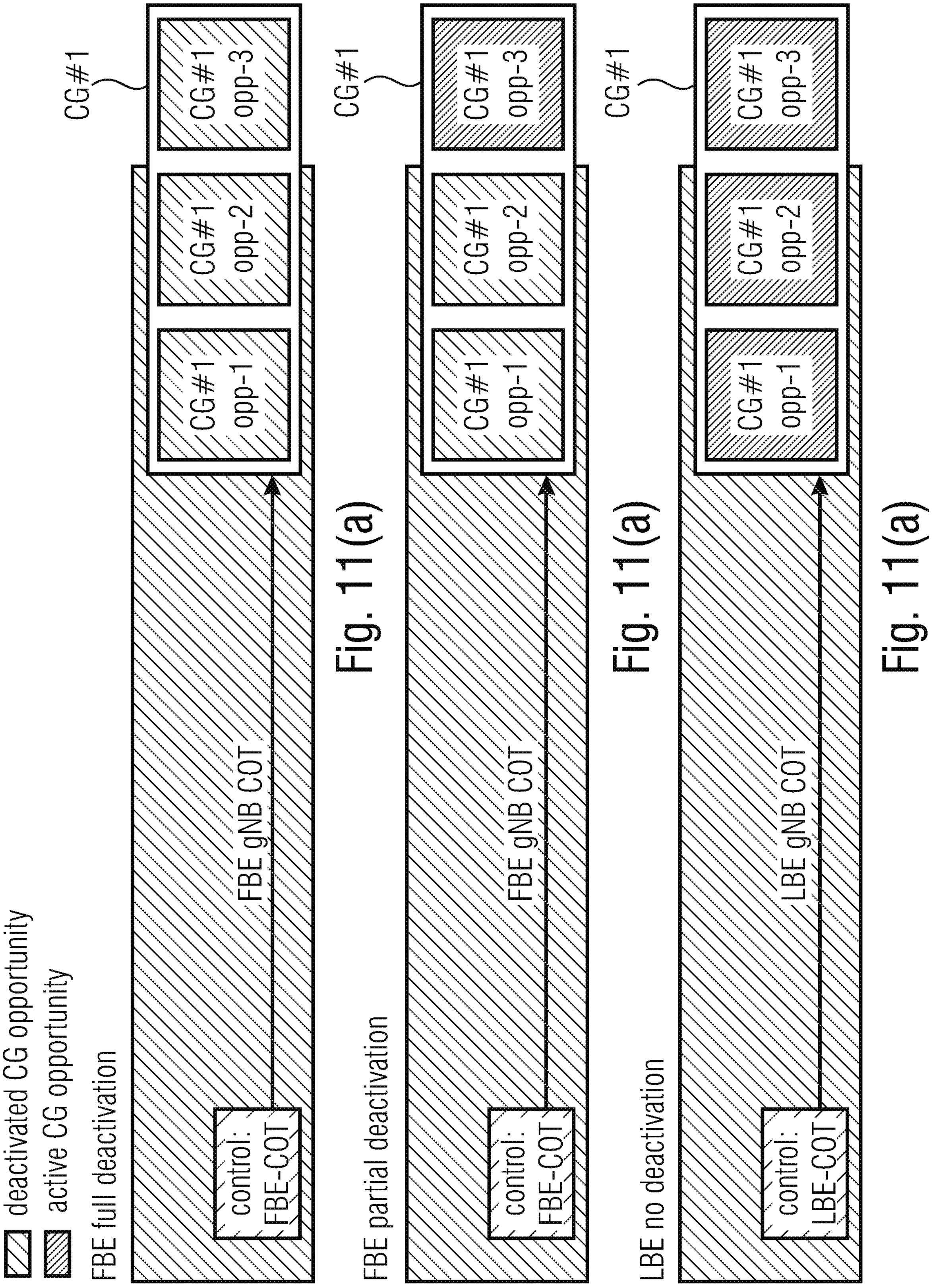
FIG. 11*a* illustrates an embodiment employing a channel access mechanism of the gNB for deciding about an activation/deactivation of a CG configuration.

In accordance with further embodiments of the third aspect of the present invention, the UE may decide about the activation/deactivation of multiple CG opportunities dependent on a channel access mechanism of the gNB. For example, the UE may read information provided by the gNB which indicates whether the current COT is an FBE COT or an LBE COT. The UE deactivates its CG configuration only in case it detects an FBE COT. FIG. 11 illustrates an embodiment employing the channel access mechanism of the gNB for deciding about the activation/deactivation of a CG configuration.

FIG. 11(*a*) illustrates an embodiment in accordance with which the UE detects from the information received from the gNB that the COT is an FBE COT. As explained above, when considering FBE devices, sharing the COT is only allowed in case an activation for the COT sharing is received. In the embodiments described herein, it is assumed that no such activation exists. In FIG. 11(*a*), the CG configuration CG #1 has three opportunities opp-1, opp-2 and opp-3, all of which are deactivated responsive to the UE detecting the COT to be an FBE COT.

FIG. 11(*b*) illustrates a further embodiment in which the UE also detects the COT to be an FBE COT. In accordance with this embodiment, only a partial deactivation is performed, other than the full deactivation described with reference to FIG. 11(*a*). In accordance with this embodiment, only opportunities opp-1 and opp-2 of CG #1 are deactivated because they are within the COT, while opp-3 remains active because it is outside the COT.

FIG. 11(*c*) illustrates a further embodiment in which the UE detects the COT to be an LBE COT which does not require any deactivation of the CGs so that all opportunities opp-1, opp-2 and opp-3 of CG #1 remain active independent of whether they are within the COT or outside the COT.

In the embodiments described above, the respective opportunities opp-1 to opp-3 of the CG configurations are configured to be arranged across time; however, in accordance with further embodiments, the multiple CG opportunities may also be provided across frequency. More specifically, in addition to the multiple CG opportunities provided across time, the UE may also be configured, for example, by the network, with additional CG resources across frequency, for example, across LBT subbands. For example, responsive to detecting a COT and a potential collision of a CG transmission with the COT, the UE may perform the CG transmission using one or more of the additional CG resources within one or more failed frequency bands, or outside a COT, e.g. on a different frequency band, or within a licensed band.

Figure 12A:
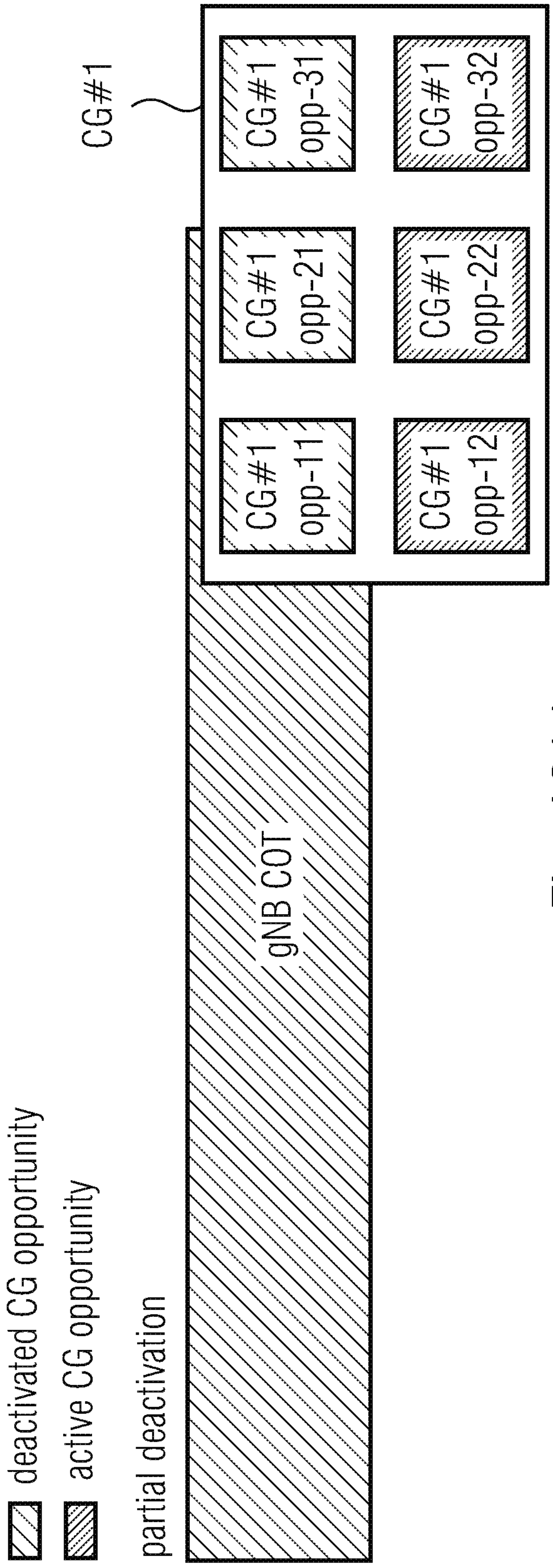
FIG. 12*a-b* illustrates an embodiment using multiple CG opportunities across the frequency domain.
Figure 12B:
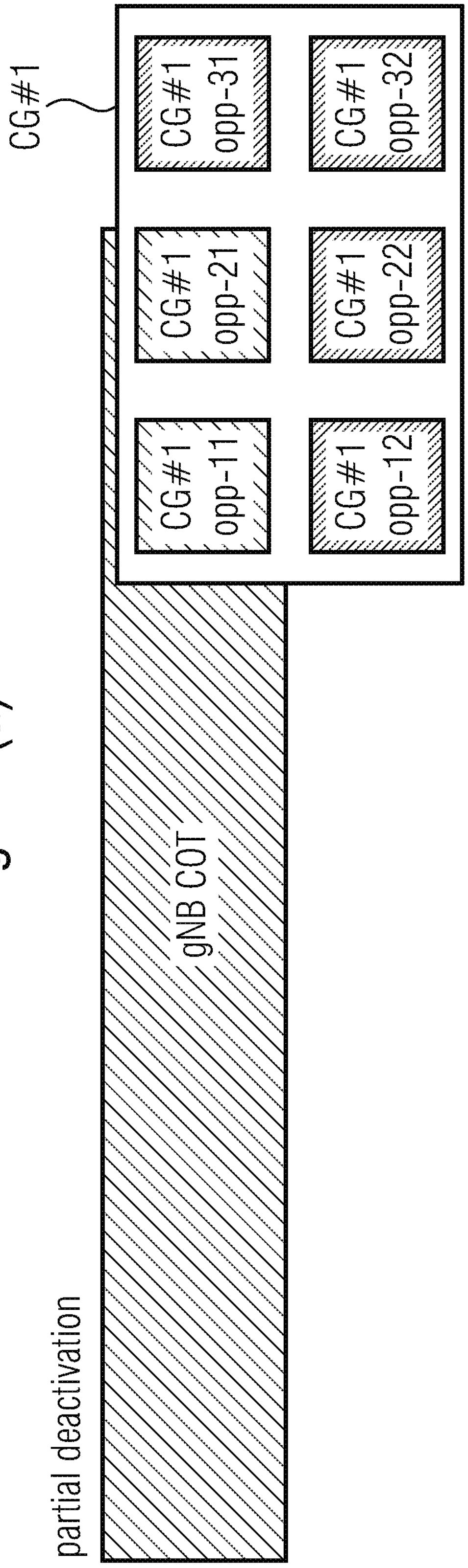

In accordance with further embodiments, the UE uses CG opportunities which do not collide with a gNB COT as is illustrated in FIG. 12. FIG. 12 illustrates examples for using multiple CG opportunities provided across the frequency domain. FIG. 12 illustrates a CG configuration CG #1 including CG opportunities opp-11 to opp-32, of which opportunities opp-11, opp-21 and opp-31 are provided across the time domain in a first frequency range, while CG opportunities opp-12, opp-22 and opp-32 are also provided across the time domain but in a different frequency range. FIG. 12 shows embodiments for a partial deactivation of CG opportunities of the CG #1 in case of a collision with a COT, like a gNB COT. FIG. 12(*a*) illustrates the partial deactivation of the CG opportunities opp-11, opp-21 and opp-31 because at least some of these opportunities overlap with the COT, similar to the embodiment described above with reference to FIG. 9. FIG. 12(*b*) also shows a partial deactivation but only of those opportunities which actually overlap with the COT, similar to the embodiment described above with reference to FIG. 10. Only opportunities opp-11 and opp-21 of CG #1 overlap actually with the COT so that the remaining opportunities remain activated. In accordance with embodiments, a within-COT procedure similar to FIG. 9 and FIG. 10 may also be employed.

With regard to the above described embodiments, it is noted that some of them have been described in detail with regard to a gNB COT; however, the embodiments are not limited to the gNB COT, rather, the mentioned COT may also be a UE COT communicating with a gNB over the Uu interface or with other UEs over a sidelink interface.

General

Embodiments of the present invention have been described in detail above, and the respective embodiments and aspects may be implemented individually or two or more of the embodiments or aspects may be implemented in combination.

Further, the embodiments described herein may be employed when communicating via a single subband that may be an unlicensed subband. However, the inventive approach is not limited to a communication over a single subband, rather, the communication may be over a plurality of subbands for a communication with one or more entities, like other UE(s) or other gNB(s), in the wireless communication system, and some or all of the plurality of subbands may be unlicensed subbands on which a communication is allowed for a certain transmission time (COT) responsive to a successful channel access procedure, e.g. Listen-Before-Talk, LBT, or a request to send/clear to send mechanism, RTS/CTS mechanism, that may be used for higher frequencies.

With regard to the above-described embodiments of the various aspects of the present invention, it is noted that they have been described in an environment in which a communication is between a transmitter, like a gNB or a UE, and a receiver, like a UE and a gNB. However, the invention is not limited to such a communication, rather, the above-described principles may equally be applied for a device-to-device communication, like a D2D, V2V, V2X communication. In such scenarios, the communication is over a sidelink between the respective devices. The transmitter is a first UE and the receiver is a second UE communicating using the sidelink resources.

In accordance with embodiments, the wireless communication system may include a terrestrial network, or a non-terrestrial network, or networks or segments of networks using as a receiver an airborne vehicle or a spaceborne vehicle, or a combination thereof.

In accordance with embodiments, a receiver may comprise one or more of a mobile or stationary terminal, an IoT device, a ground-based vehicle, an aerial vehicle, a drone, a building, or any other item or device provided with network connectivity enabling the item/device to communicate using the wireless communication system, like a sensor or actuator. In accordance with embodiments, a transmitter may comprise one or more of a macro cell base station, or a small cell base station, or a spaceborne vehicle, like a satellite or a space, or an airborne vehicle, like a unmanned aircraft system (UAS), e.g., a tethered UAS, a lighter than air UAS (LTA), a heavier than air UAS (HTA) and a high altitude UAS platforms (HAPs), or any transmission/reception point (TRP) enabling an item or a device provided with network connectivity to communicate using the wireless communication system.

Although some aspects of the described concept have been described in the context of an apparatus, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

Figure 13:
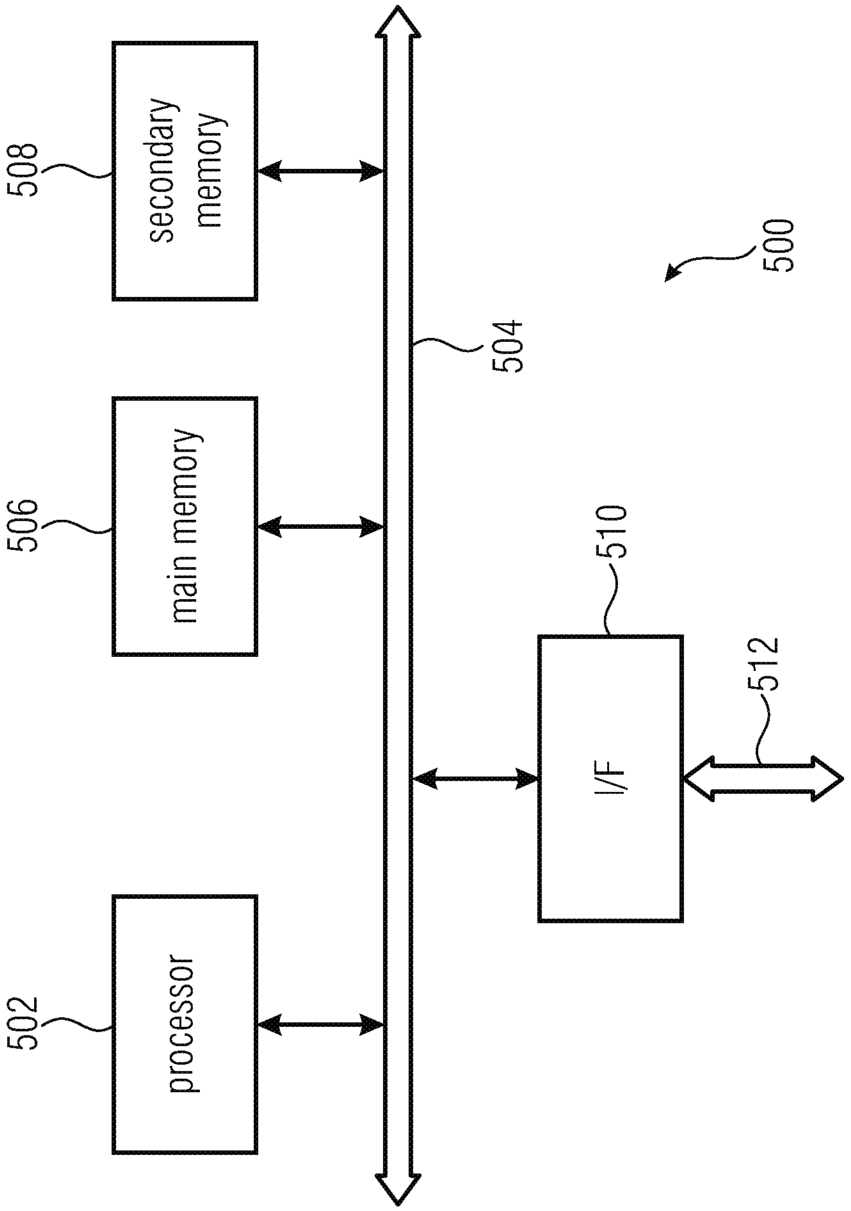
FIG. 13 illustrates an example of a computer system on which units or modules as well as the steps of the methods described in accordance with the inventive approach may execute.

Various elements and features of the present invention may be implemented in hardware using analog and/or digital circuits, in software, through the execution of instructions by one or more general purpose or special-purpose processors, or as a combination of hardware and software. For example, embodiments of the present invention may be implemented in the environment of a computer system or another processing system. FIG. 13 illustrates an example of a computer system 500. The units or modules as well as the steps of the methods performed by these units may execute on one or more computer systems 500. The computer system 500 includes one or more processors 502, like a special purpose or a general-purpose digital signal processor. The processor 502 is connected to a communication infrastructure 504, like a bus or a network. The computer system 500 includes a main memory 506, e.g., a random-access memory (RAM), and a secondary memory 508, e.g., a hard disk drive and/or a removable storage drive. The secondary memory 508 may allow computer programs or other instructions to be loaded into the computer system 500. The computer system 500 may further include a communications interface 510 to allow software and data to be transferred between computer system 500 and external devices. The communication may be in the from electronic, electromagnetic, optical, or other signals capable of being handled by a communications interface. The communication may use a wire or a cable, fiber optics, a phone line, a cellular phone link, an RF link and other communications channels 512.

The terms "computer program medium" and "computer readable medium" are used to generally refer to tangible storage media such as removable storage units or a hard disk installed in a hard disk drive. These computer program products are means for providing software to the computer system 500. The computer programs, also referred to as computer control logic, are stored in main memory 506 and/or secondary memory 508. Computer programs may also be received via the communications interface 510. The computer program, when executed, enables the computer system 500 to implement the present invention. In particular, the computer program, when executed, enables processor 502 to implement the processes of the present invention, such as any of the methods described herein. Accordingly, such a computer program may represent a controller of the computer system 500. Where the disclosure is implemented using software, the software may be stored in a computer program product and loaded into computer system 500 using a removable storage drive, an interface, like communications interface 510.

The implementation in hardware or in software may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier. In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

List of Acronyms and Symbols

BS Base Station
CBR Channel Busy Ratio
D2D Device-to-Device
EN Emergency Notification
eNB Evolved Node B (base station)
FDM Frequency Division Multiplexing
LTE Long-Term Evolution
PC5 Interface using the Sidelink Channel for D2D communication
PPPP ProSe per packet priority
PRB Physical Resource Block
ProSe Proximity Services
RA Resource Allocation
SCI Sidelink Control Information
SL sidelink
sTTI Short Transmission Time Interval
TDM Time Division Multiplexing
TDMA Time Division Multiple Access
TPC Transmit power control/transmit power command
UE User Entity (User Terminal)
URLLC Ultra-Reliable Low-Latency Communication
V2V Vehicle-to-vehicle
V2I Vehicle-to-infrastructure
V2P Vehicle-to-pedestrian
V2N Vehicle-to-network
V2X Vehicle-to-everything, i.e., V2V, V2I, V2P, V2N

The invention claimed is:

1. A user device, UE, for a wireless communication system, wherein the UE is served by a base station, gNB, and is to use one or more frequency bands for a communication with one or more entities, in the wireless communication system, wherein some or all of one or more frequency bands are unlicensed frequency bands on which a communication is allowed for a certain transmission time (COT) responsive to a successful channel access procedure, wherein the UE is preconfigured or configured with different configurations for CGs to be performed within a gNB COT obtained by the gNB and within a UE COT obtained by the UE, the different configurations including:

for CGs to be performed within the UE COT, one or more out-COT configured grant, CG, configurations so as to allow the UE to perform one or more CG transmissions outside the gNB COT by initiating the UE COT, and for CGs to be performed within the gNB COT, one or more in-COT configured grant, CG, configurations so as to allow the UE to perform one or more CG transmissions within the gNB COT, the one or more in-COT CG configurations indicating dedicated CG resources within the gNB COT to be used for CG transmission opportunities of the UE, wherein the UE is to apply the in-COT CG configuration only in response to receiving an activation signaling from a certain entity in the wireless communication system, wherein the activation signaling is a group signaling indicating a respective in-COT CG configurations for a plurality of UEs or for a group of UEs, and wherein the UE is to receive the group signaling as part of group control information transmitted in a control region, e.g., GC-PDCCH or GC-PSCCH, of one or more of frequency bands.

2. The UE of claim 1, wherein the UE is to be semi-statically or dynamically configured within a radio frame with the in-COT CG configurations, wherein the in-COT CG configurations may be stretched over time or over frequency or code domains.

3. The UE of claim 1, wherein the UE is configured using RRC signaling, and wherein the in-COT CG configuration comprises one or more of the following parameters:

a relative or an absolute time within the gNB COT, an interlace configuration, a transmission duration, a frequency or subband configuration, a channel access procedure duration or priority or category.

4. The UE of claim 1, wherein the UE is configured using control information transmitted in a control region of one or more of the frequency bands.

5. The UE of claim 1, wherein the UE is to use a CAT-2 LBT and/or interleaved-OFDMA in order to perform an interlaced transmission within the gNB COT.

6. A base station, gNB, for a wireless communication system, wherein the gNB is to serve one or more user devices, UEs, and is to use one or more frequency bands for a communication with the one or more UEs in the wireless communication system, wherein some or all of the one or more frequency bands are unlicensed frequency bands on which a communication is allowed for a certain transmission time (COT) responsive to a successful channel access procedure, wherein the gNB is to configure the one or more UEs with different configurations for CGs to be performed within a gNB COT obtained by the gNB and within a UE COT obtained by the UE, the different configurations including:

for CGs to be performed within the UE COT, one or more out-COT configured grant, CG, configurations so as to allow the UE to perform one or more CG transmissions outside the gNB COT, and for CGs to be performed within the gNB COT, one or more in-COT configured grant, CG, configurations so as to allow the UE to perform one or more CG transmissions within the gNB COT, the one or more in-COT CG configurations indicating dedicated CG resources within the gNB COT to be used for CG transmission opportunities of the UE, wherein the gNB is to signal to the UE an activation signal for applying the in-COT CG configuration, wherein the activation signaling is a group signaling indicating a respective in-COT CG configurations for a plurality of UEs or for a group of UEs, and wherein the gNB sends the group signaling as part of group control information transmitted in a control region, e.g., GC-PDCCH or GC-PSCCH, of one or more of frequency bands.

7. A wireless communication system, comprising one or more user devices, UEs, and one or more base stations, gNBs, wherein the one or more UEs comprise a UE served by a gNB and is to use one or more frequency bands for a communication with one or more entities in the wireless communication system, wherein some or all of the one or more frequency bands are unlicensed frequency bands on which a communication is allowed for a certain transmission time (COT) responsive to a successful channel access procedure, and preconfigured or configured with different configurations for CGs to be performed within a gNB COT obtained by the gNB and within a UE COT obtained by the UE, the different configurations including:

for CGs to be performed within the UE COT, one or more out-COT configured grant, CG, configurations so as to allow the UE to perform one or more CG transmissions outside the gNB COT by initiating the UE COT, and for CGs to be performed within the gNB COT, one or more in-COT configured grant, CG, configurations so as to allow the UE to perform one or more CG transmissions within the gNB COT, the one or more in-COT CG configurations indicating dedicated CG resources within the gNB COT to be used for CG transmission opportunities of the UE, wherein the UE is to apply the in-COT CG configuration only in response to receiving an activation signaling from a certain entity in the wireless communication system, wherein the activation signaling is a group signaling indicating a respective in-COT CG configurations for a plurality of UEs or for a group of Ues, and wherein the UE is to receive the group signaling as part of group control information transmitted in a control region, e.g., GC-PDCCH or GC-PSCCH, of one or more of frequency bands, and/or the one or more gNBs comprise a gNB of claim 6.

8. The wireless communication system of claim 7, wherein the UE comprises one or more of a mobile terminal, or stationary terminal, or cellular IoT-UE, or vehicular UE, or vehicular group leader (GL) UE, an IoT or narrowband IoT, NB-IoT, device, or a ground based vehicle, or an aerial vehicle, or a drone, or a moving base station, or road side unit, or a building, or any other item or device provided with network connectivity enabling the item/device to communicate using the wireless communication network, a sensor or actuator, and/or the gNB comprises one or more of a macro cell base station, or a small cell base station, or a central unit of a base station, or a distributed unit of a base station, or a road side unit, or a UE, or a group leader (GL), or a relay, or a remote radio head, or an AMF, or an SMF, or a core network entity, or mobile edge computing entity, or a network slice as in the NR or 5G core context, or any transmission/reception point, TRP, enabling an item or a device to communicate using the wireless communication network, the item or device being provided with network connectivity to communicate using the wireless communication network.

9. A method for operating a wireless communication system, the method comprising:

serving, by a base station (gNB), one or more user devices, Ues, and using one or more frequency bands for a communication with the one or more entities Ues, wherein some or all of the one or more frequency bands are unlicensed frequency bands on which a communication is allowed for a certain transmission time (COT) responsive to a successful channel access procedure, and configuring the one or more Ues with different configurations for CGs to be performed within a gNB COT obtained by the gNB and within a UE COT obtained by the UE, the different configurations including:

for CGs to be performed within the UE COT, one or more out-COT configured grant, CG, configurations so as to allow the UE to perform one or more CG transmissions outside the gNB COT by initiating the UE COT, and for CGs to be performed within the gNB COT, one or more in-COT configured grant, CG, configurations so as to allow the UE to perform one or more CG transmissions within the gNB COT, the one or more in-COT CG configurations indicating dedicated CG resources within the gNB COT to be used for CG transmission opportunities of the UE, wherein the UE applies the in-COT CG configuration only in response to receiving an activation signaling from a certain entity in the wireless communication system, wherein the activation signaling is a group signaling indicating a respective in-COT CG configurations for a plurality of Ues or for a group of Ues, and wherein the UE receives the group signaling as part of group control information transmitted in a control region, e.g., GC-PDCCH or GC-PSCCH, of one or more of frequency bands.

10. A non-transitory digital storage medium having a computer program stored thereon to perform, when said computer program is run by a computer, a method for operating a wireless communication system, said method comprising:

serving, by a base station (gNB), one or more user devices, Ues, and using one or more frequency bands for a communication with one or more Ues, wherein some or all of the one or more frequency bands are unlicensed frequency bands on which a communication is allowed for a certain transmission time (COT) responsive to a successful channel access procedure, and configuring the one or more Ues, e.g., using an RRC signaling, with different configurations for CGs to be performed within a gNB COT obtained by the gNB and within a UE COT obtained by the UE, the different configurations including:

for CGs to be performed within the UE COT, one or more out-COT configured grant, CG, configurations so as to allow the UE to perform one or more CG transmissions outside the gNB COT by initiating the UE COT, and for CGs to be performed within the gNB COT, one or more in-COT configured grant, CG, configurations so as to allow the UE to perform one or more CG transmissions within the gNB COT, the one or more in-COT CG configurations indicating dedicated CG resources within the gNB COT to be used for CG transmission opportunities of the UE, wherein the UE applies the in-COT CG configuration only in response to receiving an activation signaling from a certain entity in the wireless communication system, wherein the activation signaling is a group signaling indicating a respective in-COT CG configurations for a plurality of Ues or for a group of Ues, and wherein the UE receives the group signaling as part of group control information transmitted in a control region, e.g., GC-PDCCH or GC-PSCCH, of one or more of frequency bands.

* * * * *